United States Patent
Guo et al.

(10) Patent No.: US 11,373,445 B2
(45) Date of Patent: Jun. 28, 2022

(54) METHOD AND APPARATUS FOR PROCESSING DATA, AND COMPUTER READABLE STORAGE MEDIUM

(71) Applicant: GUANGDONG OPPO MOBILE TELECOMMUNICATIONS CORP., LTD., Guangdong (CN)

(72) Inventors: Ziqing Guo, Guangdong (CN); Haitao Zhou, Guangdong (CN); Kamwing Au, Guangdong (CN); Xiao Tan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 251 days.

(21) Appl. No.: 16/740,374

(22) Filed: Jan. 10, 2020

(65) Prior Publication Data

US 2020/0151436 A1    May 14, 2020

Related U.S. Application Data

(63) Continuation of application No. PCT/CN2019/082696, filed on Apr. 15, 2019.

(30) Foreign Application Priority Data

Aug. 1, 2018  (CN) .......................... 201810864802.5
Aug. 1, 2018  (CN) .......................... 201810864804.4
Aug. 1, 2018  (CN) .......................... 201810866139.2

(51) Int. Cl.
*G06V 40/16*    (2022.01)
*G06F 9/54*     (2006.01)
(Continued)

(52) U.S. Cl.
CPC ............ *G06V 40/172* (2022.01); *G06F 9/544* (2013.01); *G06F 21/32* (2013.01); *G06F 21/602* (2013.01)

(58) Field of Classification Search
CPC ... G06K 9/00288; G06F 21/602; G06F 9/544; G06F 21/32
See application file for complete search history.

(56) References Cited

U.S. PATENT DOCUMENTS 9,779,381 B1    10/2017 Konanur
2005/0265618 A1  12/2005 Jebara
(Continued)

FOREIGN PATENT DOCUMENTS

CN    102393970 A    3/2012
CN    102402788 A    4/2012
(Continued)

OTHER PUBLICATIONS

English translation of Notice of Allowance of CN application 201810864804.4 dated May 8, 2020.
(Continued)

*Primary Examiner* — Ruiping Li
(74) *Attorney, Agent, or Firm* — Young Basile Hanlon & MacFarlane, P.C.

(57) ABSTRACT

A method and an apparatus for processing data, and a non-transitory computer readable storage medium. The method includes: obtaining a face recognition model stored in a first operation environment; performing an initialization on the face recognition model in the first operation environment, and transmitting the face recognition model subjected to the initialization to a second operation environment for storing, in which, a storage space in the first operation environment is greater than a storage space in the second operation environment.

20 Claims, 15 Drawing Sheets

(51) Int. Cl.
*G06F 21/32* (2013.01)
*G06F 21/60* (2013.01)

(56) References Cited

U.S. PATENT DOCUMENTS

| | | | |
|---|---|---|---|
| 2013/0036458 A1 | 2/2013 | Liberman et al. | |
| 2014/0231501 A1 | 8/2014 | Mykhailenko et al. | |
| 2015/0261576 A1 | 9/2015 | Gong et al. | |
| 2017/0154273 A1* | 6/2017 | Guttmann | H04L 67/10 |
| 2017/0255941 A1 | 9/2017 | Chandrasekaran et al. | |
| 2017/0345146 A1 | 11/2017 | Fan et al. | |
| 2019/0236416 A1* | 8/2019 | Wang | G06F 3/167 |

FOREIGN PATENT DOCUMENTS

| | | |
|---|---|---|
| CN | 104361311 A | 2/2015 |
| CN | 105446713 A | 3/2016 |
| CN | 105930731 A | 9/2016 |
| CN | 105930732 A | 9/2016 |
| CN | 105930733 A | 9/2016 |
| CN | 106682650 A | 5/2017 |
| CN | 107169343 A | 9/2017 |
| CN | 107341481 A | 11/2017 |
| CN | 107729889 A | 2/2018 |
| CN | 107766713 A | 3/2018 |
| CN | 107992729 A | 5/2018 |
| CN | 108009999 A | 5/2018 |
| CN | 108985255 A | 12/2018 |
| CN | 109145772 A | 1/2019 |
| CN | 109213610 A | 1/2019 |
| TW | 200947097 A | 11/2009 |

OTHER PUBLICATIONS

English translation of First OA for CN application 201810866139.2 dated May 9, 2020.
English translation of First OA for CN application 201810864802.5 dated Apr. 28, 2020.
International Search Report with English Translation for PCT application PCT/CN2019/082696 dated Jul. 15, 2019.
European Search Report for EP application 19843800.4 dated Dec. 2, 2020.
Indian Examination Report for IN Application 202017011331 dated Nov. 10, 2021. (7 pages).

* cited by examiner

METHOD AND APPARATUS FOR PROCESSING DATA, AND COMPUTER READABLE STORAGE MEDIUM

CROSS-REFERENCE TO RELATED APPLICATION(S)

This application is a continuation application of PCT Application No. PCT/CN2019/082696, which claims priorities to Chinese Patent Application Nos. 201810864804.4, 201810866139.2 and 201810864802.5, filed on Aug. 1, 2018, the entire contents of all of which are incorporated herein by reference in their entireties.

TECHNICAL FIELD

Embodiments of the present disclosure relate to a field of computer technology, and more particularly to a method and an apparatus for processing data, and a computer readable storage medium.

BACKGROUND

Face recognition technology is applied to people's work and life gradually, for example, may collect a face image to perform payment verification, unlocking verification, and may also perform face beauty processing on a captured face image. By the face recognition technology, detection may be performed on a face in an image, and it may also be recognized whether the face in the image belongs to a people's face, thus recognizing an identity of a user.

SUMMARY

Embodiments of the present disclosure provide a method and an apparatus for processing data, and a computer readable storage medium.

The method for processing data includes: obtaining a face recognition model stored in a first operation environment; and performing an initialization on the face recognition model in the first operation environment, and transmitting the face recognition model subjected to the initialization to a second operation environment for storing, in which, a storage space in the first operation environment is greater than a storage space in the second operation environment.

The apparatus for processing data includes: one or more processors, a memory storing instructions executable by the one or more processors, in which the one or more processors are configured to: obtain a face recognition model stored in a first operation environment; perform an initialization on the face recognition model in the first operation environment, and transmit the face recognition model subjected to the initialization to a second operation environment for storing, in which, a storage space in the first operation environment is greater than a storage space in the second operation environment.

The computer readable storage medium has a computer program stored thereon. The computer program is configured to implement a method for processing data described above when executed by a processor. The method includes: obtaining a face recognition model stored in a first operation environment; and performing an initialization on the face recognition model in the first operation environment, and transmitting the face recognition model subjected to the initialization to a second operation environment for storing, in which, a storage space in the first operation environment is greater than a storage space in the second operation environment.

BRIEF DESCRIPTION OF DRAWINGS

In order to clearly illustrate embodiments of the present disclosure or technical solutions in the prior art, a brief description of accompanying drawings used in embodiments or in the prior art descriptions is given below. Obviously, the accompanying drawings in the following descriptions are only part embodiments of the present disclosure, and for those skilled in the art, other drawings can be obtained according to these drawings without creative labor.

DETAILED DESCRIPTION

In order to make objectives, technical solutions and advantages of the present disclosure more clear and obvious, the present disclosure will be further illustrated in detail in combination with accompanying drawings and embodiments hereinafter. It should be understood that, detailed embodiments described herein are intended to explain the present disclosure, which are not limited to the present disclosure.

It should be understood that, although terms "first", "second" and the like may be used herein to describe various elements, these elements should not be limited by these terms. These terms are only used to distinguish one element from another. For example, without departing from the scope of the present disclosure, a first client may be called as a second client, and similarly, the second client may be called as the first client. Both the first client and the second client are clients, but not the same client.

Figure 1:
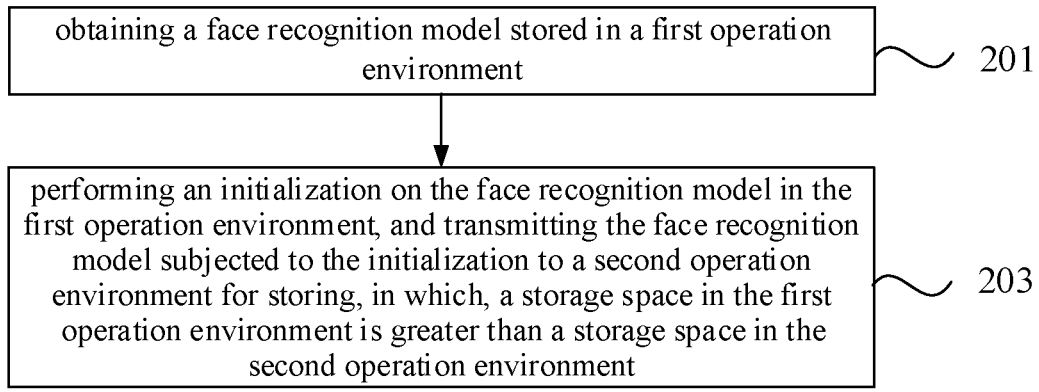
FIG. 1 is a flow chart illustrating a method for processing data in an embodiment of the present disclosure.

Please refer to FIG. 1, embodiments of the present disclosure provide a method for processing data. The method includes actions in following blocks.

At block 201, a face recognition model stored in a first operation environment is obtained.

At block 203, an initialization is performed on the face recognition model in the first operation environment, and the face recognition model subjected to the initialization is transmitted to a second operation environment for storing, in which, a storage space in the first operation environment is greater than a storage space in the second operation environment.

Figure 2:
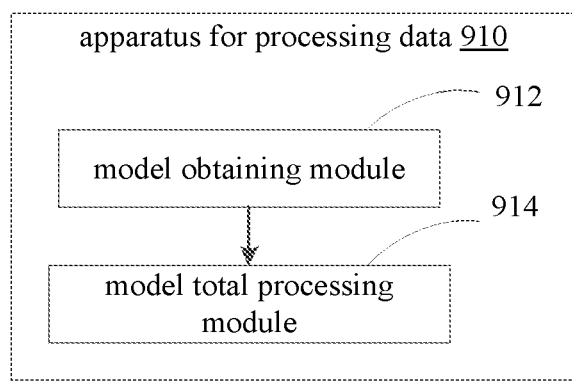
FIG. 2 is a block diagram illustrating an apparatus for processing data in an embodiment of the present disclosure.

Please refer to FIG. 2, embodiments of the present disclosure provide an apparatus for processing data. The apparatus 910 includes a model obtaining module 912 and a model total processing module 914. The model obtaining module 912 is configured to obtain a face recognition model stored in a first operation environment. The model total processing module 914 is configured to perform an initialization on the face recognition model in the first operation environment, and to transmit the face recognition model subjected to the initialization to a second operation environment for storing. A storage space in the first operation environment is greater than a storage space in the second operation environment.

Figure 3:
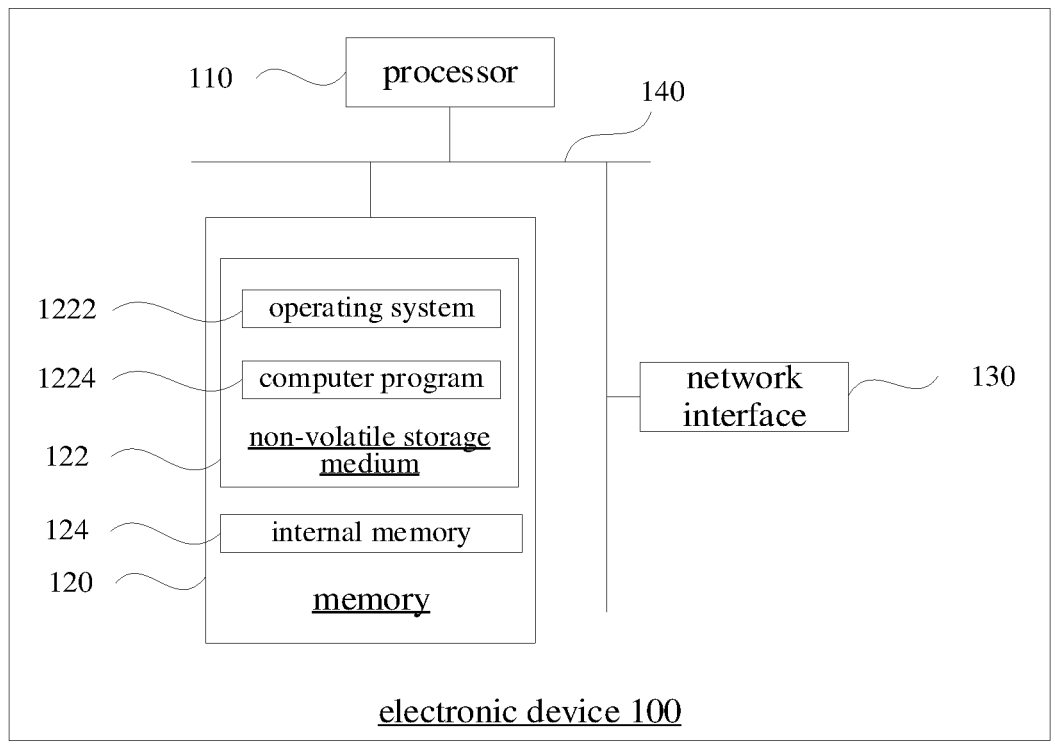
FIG. 3 is a block diagram illustrating an internal structure of an electronic device in an embodiment of the present disclosure.

First Implementation:

FIG. 3 is a block diagram illustrating an internal structure of an electronic device in an embodiment of the present disclosure. As illustrated in FIG. 3, the electronic device 100 includes a processor 110, a memory 120 and a network interface 130 coupled to a system bus 140. The processor 110 is configured to provide computing and controlling ability to support operation of the entire electronic device 100. The memory 120 is configured to store data, programs and the like. The memory 120 has at least one computer program 1224 stored thereon. The computer program 1224 may be configured to implement a method for processing data provided in embodiments of the present disclosure when executed by the processor 110. The memory 120 may include a non-volatile storage medium such as a magnetic disk, an optical disk, a read-only memory (ROM), or a random storage memory (RAM). For example, in an embodiment, the memory 120 includes a non-volatile storage medium 122 and an internal memory 124. The non-volatile storage medium 122 has an operating system 1222 and a computer program 1224 stored thereon. The computer program 1224 is configured to implement a method for processing data provided in embodiments of the present disclosure when executed by the processor 110. The internal memory 124 provides a cached operation environment for the operating system 1222 and the computer program 1224 in the non-volatile storage medium 122. The network interface 130 may be an Ethernet card or a wireless network card or the like for communicating with the external electronic device 100. The electronic device 100 may be a phone, a tablet, a personal assistant, a wearable device or the like.

Figure 4:
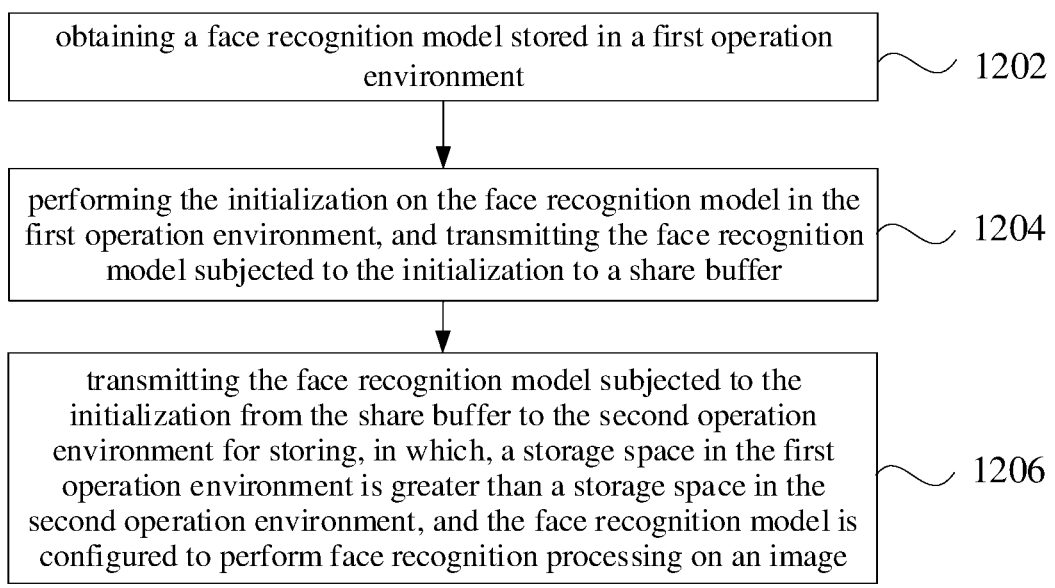
FIG. 4 is a flow chart illustrating a method for processing data in an embodiment of the present disclosure.

FIG. 4 is a flow chart illustrating a method for processing data in an embodiment. The method for processing data includes actions at blocks 1202-1206.

At block 1202, a face recognition model stored in a first operation environment is obtained.

In detail, the electronic device may include a processor. The processor may perform processing such as storing, computing and transmission on data. The processor in the electronic device may operate in different environments. For example, the processor may operate in a TEE (trusted execution environment), or may operate in a REE (rich execution environment). When the processor operates in the TEE, the security of data is higher. When the processor operates in the REE, the security of data is relatively low.

The electronic device may allocate resources of the processor and divide different resources for different operation environments. For example, in common circumstances, there are fewer processes with higher security requirements in the electronic device, and there are more common processes in the electronic device. Therefore, the electronic device may divide a small part of the resources of the processor into an operation environment with higher security, and divide most of the resources of the processor into an operation environment with low security.

The face recognition model is an algorithm model for performing face recognition on a face in an image, which is stored generally in form of a file. It may be understood that, since an algorithm for performing the face recognition in the image is complex, a storage space occupied by a stored face recognition model is large. After the electronic device divides the resources of the processor into different operation environments, a divided storage space in the first operation environment is greater than a divided storage space in the second operation environment. Therefore, the electronic device may store the face recognition model in the first operation environment, to allow that there is enough space in the second operation environment to perform processing on data.

At block 1204, an initialization is performed on the face recognition model in the first operation environment, and the face recognition model subjected to the initialization is transmitted to a share buffer.

The share buffer is a channel for transmitting data between the first operation environment and the second operation environment. The first operation environment and the second operation environment may access the share buffer. The electronic device may store the face recognition model in the first operation environment, perform the initialization on the face recognition model in the first operation environment, store the face recognition model subjected to the initialization in the share buffer, and then transmit the face recognition model to the second operation environment.

It should be noted that, the electronic device may perform configuration on the share buffer, and may set a size of a storage space of the share buffer based on needs. For example, the electronic device may set the size of the storage space of the share buffer to 5 M, or 10 M. The first operation environment may obtain a remaining storage space in the second operation environment before performing the initialization on the face recognition model. When the remaining storage space is lower than a space threshold, the initialization is performed on the face recognition model in the first operation environment, and the face recognition model subjected to the initialization is transmitted to the share buffer. The space threshold may be set based on needs, which is generally a sum of the storage space occupied by the face recognition model and the storage space performing the initialization on the face recognition model.

In embodiments of the present disclosure, when the remaining storage space in the second operation environment is large, the face recognition model may be sent to the second operation environment directly, and the initialization is performed the face recognition model in the second operation environment, and then the original face recognition model is deleted after the initialization. In this way, security of data may be ensured. The method for processing data described above may also include: when the remaining storage space is greater than or equal to the space threshold, transmitting the face recognition model to the share buffer, transmitting the face recognition model from the share buffer to the second operation environment; performing the initialization on the face recognition model in the second operation environment, deleting the face recognition model before the initialization, and reserving the face recognition model after the initialization.

At block 1206, the face recognition model subjected to the initialization is transmitted from the share buffer to the second operation environment for storing, in which, the storage space of the first operation environment is greater the storage space in the second operation environment, and the face recognition model is configured to perform face recognition processing on an image. That is, performing the initialization on the face recognition model in the first operation environment and transmitting the face recognition model subjected to the initialization to the second operation environment for storing include: performing the initialization on the face recognition model in the first operation environment, and transmitting the face recognition model subjected to the initialization to a share buffer; and transmitting the face recognition model subjected to the initialization from the share buffer to the second operation environment for storing, in which, the face recognition model is configured to perform face recognition processing on an image.

In an embodiment provided by the present disclosure, the electronic device may perform the face recognition processing on the image via the face recognition model in the second operation environment. It should be noted that, before performing the face recognition processing on the image, there is a need to perform the initialization on the face recognition model. When the face recognition model is stored in the second operation environment, the stored face recognition model needs to occupy the storage space in the second operation environment while performing the initialization on the face recognition model also needs to occupy the storage space in the second operation environment, thus causing excessive resource consumption in the second operation environment, and affecting the efficiency of processing data.

For example, the face recognition model occupies a space of 20 M in the memory, and performing the initialization on the face recognition model needs additional 10 M in the memory. When both storing and the initialization are performed on the face recognition model simultaneously, 30 M in the memory of the second operation environment is needed. However, when the face recognition model is stored in the first operation environment and initialized in the first operation environment, and then the face recognition model subjected to the initialization is sent to the second operation environment, only 10 M in the memory of the second operation environment needs to be occupied, which greatly reduces the resource occupancy rate in the second operation environment.

In an embodiment, the actions at block 1202 may be executed when it is detected that an initialization condition is met. For example, the face recognition model is stored in the first operation environment, and the electronic device may perform the initialization on the face recognition model when turned on, may also perform the initialization on the face recognition model when it is detected that an application needing to perform the face recognition processing is turned on, and may also perform the initialization on the face recognition model when a face recognition instruction is detected, and then the face recognition model subjected to the initialization is compressed and transmitted to the second operation environment.

Figure 5:
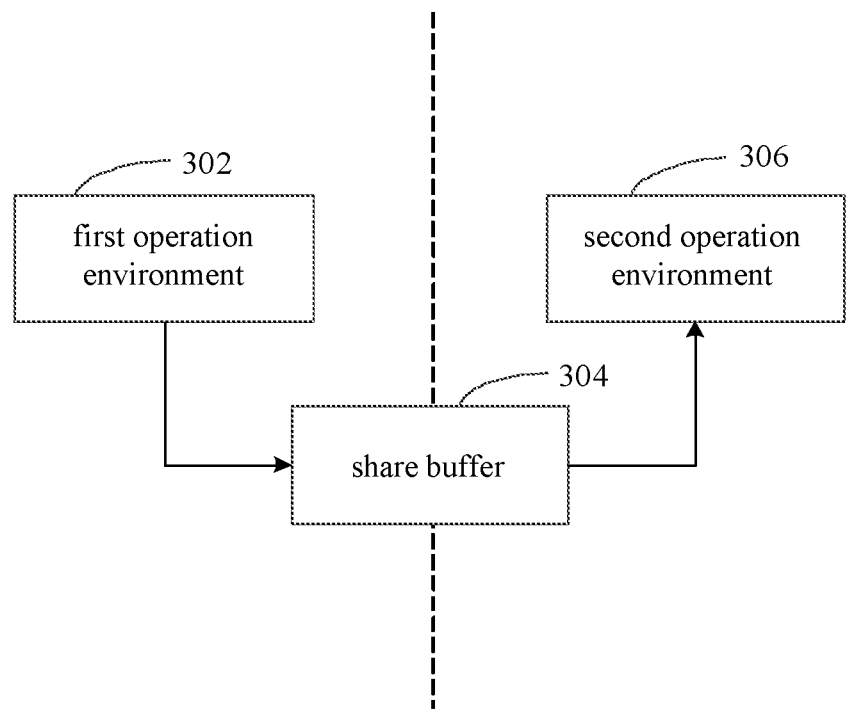
FIG. 5 is a schematic diagram illustrating a system for implementing a method for processing data in an embodiment of the present disclosure.

FIG. 5 is a schematic diagram illustrating a system for implementing a method for processing data in an embodiment. As illustrated in FIG. 5, the system includes a first operation environment 302, a share buffer 304 and a second operation environment 306. The first operation environment 302 and the second operation environment 306 may perform data transmission via the share buffer 304. The face recognition model is stored in the first operation environment 302. The system may obtain the face recognition mode stored in the first operation environment 302, and perform the initialization on the obtained face recognition model, and then transmit the face recognition model subjected to the initialization to the share buffer 304. The face recognition model subjected to the initialization is transmitted to the second operation environment 306 via the share buffer 304.

It should be understood that, the face recognition model generally includes a plurality of processing modules. Respective processing modules perform different processing. The plurality of modules may be independent with each other, for example, may include a face detection module, a face matching module and a living body detection module. A part of processing modules may have lower requirement for security, and a part of processing modules may have higher requirement for security. Therefore, the processing modules with lower security may be initialized in the first operation environment, and the processing modules with higher security may be initialized in the second operation environment.

In detail, the action at block 1204 may include: performing a first initialization on a first module in the face recognition model in the first operation environment, and transmitting the face recognition model subjected to the first initialization to a second operation environment for storing. After the action at block 1206 is performed, the method may include: transmitting the face recognition model subjected to the initialization from the share buffer to the second operation environment for storing. After the action at block 1206 is performed, the method may include: performing a second initialization on a second model in the face recognition model subjected to the initialization. The second model is a module other than the first model in the face recognition model. The security of the first model is lower than the security of the second model. For example, the first model may be a face detection model, and the second model may be a face matching model and a living body detection model. Since the first model has a low requirement for the security, the initialization is performed on the first model in the first operation environment. Since the second model has a higher requirement for the security, the initialization is performed on the second model in the second operation environment.

With the method for processing data provided in the above embodiment, the face recognition model may be stored in the first operation environment, and then the face recognition model subjected to the initialization is transmitted to the second operation environment from the share buffer after the initialization is performed on the face recognition model in the first operation environment. Since the storage space in the second operation environment is smaller than the storage space in the first operation environment, performing the initialization on the face recognition model in the first operation environment may improve the efficiency for initializing the face recognition model and reduce a resource occupation rate in the second operation environment.

Figure 6:
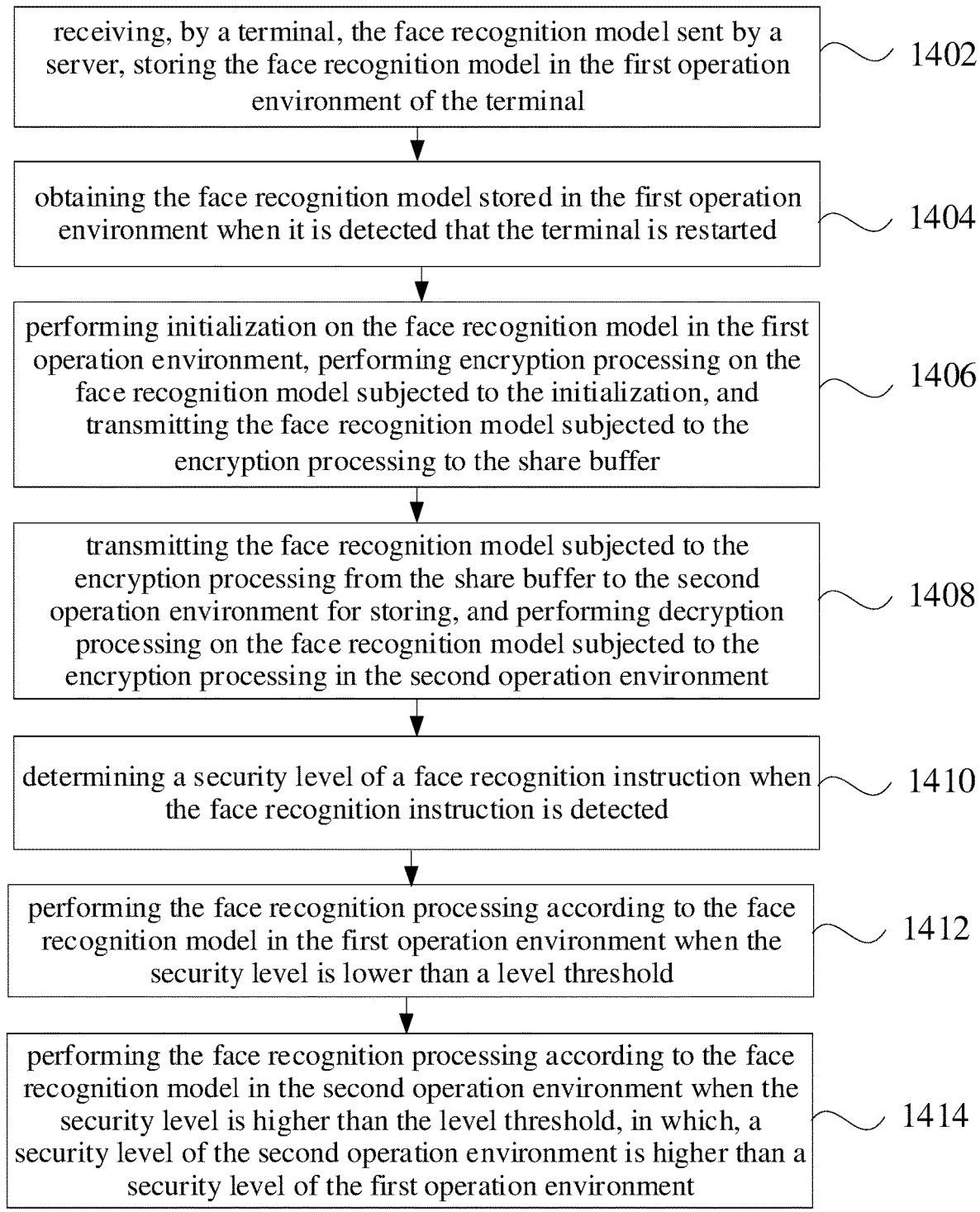
FIG. 6 and FIG. 7 are flow charts illustrating methods for processing data in embodiments of the present disclosure.

FIG. 6 is a flow chart illustrating a method for processing data in an embodiment of the present disclosure. As illustrated in FIG. 6, the method for processing data includes actions at block 1402 to block 1414.

At block 1402, a terminal receives the face recognition model sent by a server and stores the face recognition model in the first operation environment of the terminal.

In general, before performing face recognition, training is performed on the face recognition model, such that the face recognition model has higher recognition accuracy. During performing the training on the face recognition model, a training image set may be obtained, an image in the training image set is taken as an input of the face recognition model, and a training parameter of the face recognition model is adjusted constantly according to a training result obtained during training, to obtain an optimum parameter of the face recognition model. The more images are included in the training image set, the more accurate the face recognition model obtained by training will be, but time consumption will increase accordingly.

In an embodiment, the electronic device may be a terminal interacting with a user. However, since resources in the terminal are limited, the training is performed on the face recognition model in the server. The server may send the trained face recognition model to the terminal after performing the training on the face recognition model. The terminal may store the trained face recognition model in the first operation environment after receiving the trained face recognition model.

At block 1404, the face recognition model stored in the first operation environment is obtained when it is detected that the terminal is restarted.

The terminal may include the first operation environment and the second operation environment. The terminal may perform the face recognition processing on an image in the second operation environment. However, since the storage space divided into the first operation environment by the terminal is greater than the storage space divided into the second operation environment, the terminal may store the received face recognition model in the storage space of the first operation environment. When it is detected that the terminal is restarted every time, the face recognition model stored in the first operation environment is loaded to the second operation environment. In this way, the loaded face recognition model in the second operation environment may be invoked directly for processing when there is a need to perform the face recognition processing on the image.

It should be understood that, the face recognition model may be updated. When the face recognition model is updated, the server may send the updated face recognition model to the terminal. The terminal stores the updated face recognition model in the first operation environment to cover the original face recognition model after receiving the updated face recognition model. Then the terminal is controlled to restart. The updated face recognition model may be obtained after the terminal is restarted, and the initialization is performed on the updated face recognition model.

At block 1406, the initialization is performed on the face recognition model in the first operation environment, encryption processing is performed on the face recognition model subjected to the initialization, and the face recognition model subjected to the encryption processing is transmitted to the share buffer.

There is a need to perform the initialization on the face recognition model before performing the face recognition processing on the face recognition model. During the initialization, parameters, modules and the like in the face recognition model may be set as a default state. Since performing the initialization on the face recognition model also needs to occupy the memory, the terminal may perform the initialization on the face recognition model in the first operation environment, and then send the face recognition model subjected to the initialization to the second operation environment. In this way, the face recognition processing may be directly performed on the face recognition model in the second operation environment and does not need to occupy additional memory to perform the initialization on the face recognition model.

In embodiments provided by the present disclosure, the first operation environment may be a common operation environment, the second operation environment may be a safe operation environment, and the security of the second operation environment is higher than the security of the first operation environment. The first operation environment is generally configured to perform processing on application operations with lower security, and the second operation environment is generally configured to perform processing on application operations with higher security. For example, operations with lower security such as photographing and games may be performed in the first operation environment, and operations with higher security such as payment and unlocking may be performed in the second operation environment.

The second operation environment is generally used for performing application operations with high security. Therefore, when the face recognition model is sent to the second operation environment, there is a need to ensure the security of the face recognition model. After the initialization is performed on the face recognition model in the first operation environment, the encryption processing may be performed on the face recognition model subjected to the initialization, and then send the face recognition model subjected to the encryption processing to from the share buffer to the second operation environment.

At block 1408, the face recognition model subjected to the encryption processing is transmitted from the share buffer to the second operation environment for storing, and decryption processing is performed on the face recognition model subjected to the encryption processing in the second operation environment.

The face recognition model after the encryption processing is transmitted from the share buffer to the second operation environment after being transmitted from the first operation environment to the share buffer. The second operation environment performs decryption processing on the received face recognition model subjected to the encryption processing. Algorithms for performing the encryption processing on the face recognition model are not limited in this embodiment. For example, the encryption processing may be performed according to the encryption algorithm such as data encryption standard (DES), message-digest algorithm 5 (MD5), diffie-hellman (HAVAL) and the like.

At block 1410, a security level of a face recognition instruction is determined when the face recognition instruction is detected.

Both the first operation environment and the second operation environment have the face recognition model stored therein. The terminal may perform the face recognition processing in the first operation environment, and may also perform the face recognition processing in the second operation environment. In detail, the terminal may determine that the face recognition processing is performed in the first operation environment or in the second operation environment according to the face recognition instruction for triggering the face recognition processing.

The face recognition instruction is initiated by an upper-level application of the terminal. The upper-level application may write information such as time at which the face recognition instruction is sent, an application marker and an operation marker to the face recognition instruction. The application marker may be used to mark an application that initiates the face recognition instruction. The operation marker may be used to mark an application operation which needs to be performed by a face recognition result. For example, an application operation such as payment, unlocking or face beauty on an image may be performed by the face recognition result, and the operation marker in the face recognition instruction is configured to mark the application operation such as payment, unlocking or the face beauty on the image.

The security level is used to represent the security of the application operation. The higher the security level, the higher the security requirement of the application operation is. For example, the payment operation has a high requirement for the security, and the face beauty on the image has a lower requirement for the security, so the security level of the payment operation is higher than the security level of the face beauty on the image. The security level may be written to the face recognition instruction. The terminal may directly read the security level in the face recognition instruction after detecting the face recognition instruction. The terminal may also establish a corresponding relationship of the operation marker in advance, and obtain a corresponding security level by the operation marker in the face recognition instruction after detecting the face recognition instruction.

At block 1412, the face recognition processing is performed according to the face recognition model in the first operation environment when the security level is lower than a level threshold.

When it is detected that the security level is lower than the level threshold, it is considered that the application operation initiating the face recognition processing has a lower requirement for the security, and the face recognition processing may be performed directly according to the face recognition model in the first operation environment. In detail, the face recognition processing may include, but be not limited to, one or more of face detection, face matching and living body detection. The face detection refers to detect whether there is a face in an image. The face matching refers to match the detected face with a preset face. The living body detection refers to detect whether the face in the target image is biologically active.

At block 1414, the face recognition processing is performed according to the face recognition model in the second operation environment when the security level is higher than the level threshold. A security level of the second operation environment is higher than a security level of the first operation environment.

When it is detected that the security level is higher than the level threshold, it is considered that the application operation initiating the face recognition processing has a higher requirement for the security, and the face recognition processing may be performed according to the face recognition model in the second operation environment. In detail, the terminal may send the face recognition instruction to the second operation environment, and control a camera module to collect an image via the second operation environment. The collected image may be sent to the second operation environment firstly, and the security level of the application operation is determined in the second operation environment. When the security level is lower than the level threshold, the collected image is sent to the first operation environment for performing the face recognition processing. When the security level is higher than the level threshold, the face recognition processing is performed on the collected image in the second operation environment.

Figure 7:
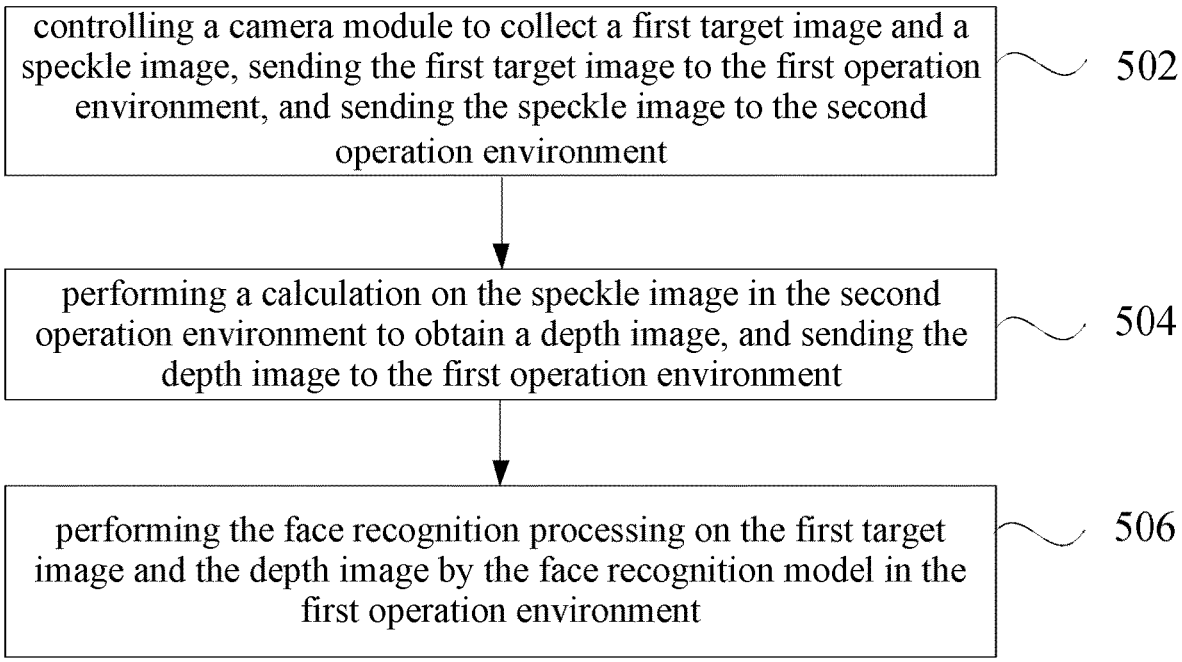

In detail, as illustrated in FIG. 7, performing the face recognition processing in the first operation environment includes actions at following blocks.

At block 502, a camera module is controlled to collect a first target image and a speckle image, the first target image is sent to the first operation environment, and the speckle image is sent to the second operation environment.

An application installed in the terminal may initiate a face recognition instruction, and the face recognition instruction is sent to the second operation environment. When it is detected that the security level of the face recognition instruction is lower than the level threshold of the second operation environment, the camera module may be controlled to collect the first target image and the speckle image. The first target image collected by the camera module may be sent to the first operation environment directly, and the collected speckle image may be sent to the second operation environment.

In an embodiment, the first target image may be a visible light image, or other types of images, which is not limited herein. When the first target image is the visible light image, the camera module may include a red green blue (RGB) camera, and the first target image may be collected via the RGB camera. The camera module may include a laser light and a laser camera. The terminal may control the laser light to be turned on, and then collect a speckle image formed by laser speckles emitted by the laser light collected by the laser camera.

In detail, when a laser illuminates on optical roughness surfaces with an average fluctuation greater than a wavelength of an order of magnitude, wavelets scattered by randomly distributed face elements on these surfaces overlap each other, such that a reflected light field has a random spatial intensity distribution, a structure with a granular structure is presented, which is a laser speckle. The formed laser speckle has a high randomness. Therefore, lasers emitted by different laser transmitters generate different laser speckles. When the formed laser speckle is emitted to objects with different depths and shapes, the generated speckle images are different. The laser speckles formed by the different laser lights are unique, such that the obtained speckle images are also unique.

At block 504, a calculation is performed on the speckle image in the second operation environment to obtain a depth image, and the depth image is sent to the first operation environment.

In order to protect the security of the data, the terminal will ensure that the speckle image is always processed in a safe environment. Therefore, the terminal will transmit the speckle image to the second operation environment for processing. The depth image is used to represent depth information of a captured object, and may be obtained according to the speckle image. The terminal may control the camera module to collect the first target image and the speckle image simultaneously. The depth image obtained according to the speckle image may represent the depth information of the object in the first target image.

The depth image may be obtained according to the speckle image and a reference image in the second operation environment. The depth image is collected when the laser speckle is illuminated to the reference plane. Therefore, the reference image has reference depth information thereon. Firstly, an opposing depth is calculated according to offsets that positions of speckle points in the speckle image relative to positions of the speckle points in the reference image. The opposing depth may represent depth information between an actual captured object and the reference plane. Then, actual depth information of the object may be calculated according to the obtained opposing depth and the reference depth. In detail, the reference image is compared with the speckle image to obtain offset information. The offset information is used to represent horizontal offset of the speckle points in the speckle image relative to the corresponding speckle points in the reference image. The depth image is obtained according to the offset information and the reference depth information.

Figure 8:
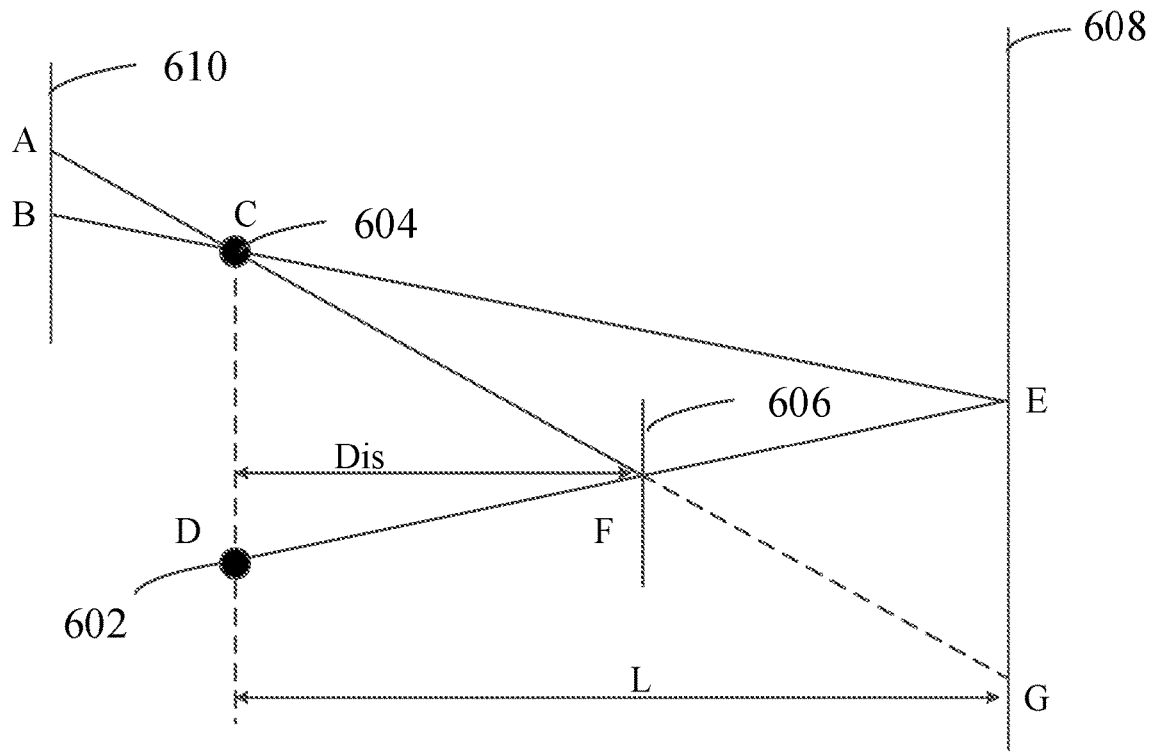
FIG. 8 is a schematic diagram illustrating calculation of depth information in an embodiment of the present disclosure.

FIG. 8 is a schematic diagram illustrating calculation of depth information in an embodiment. As illustrated in FIG. 8, the laser light 602 may generate laser speckles. A formed image may be obtained via the laser camera 604 after the laser speckles are reflected by an object. During calibration of a camera, the laser speckle emitted by the laser light 602 may be reflected by a reference plane 608, and a reflected light ray is collected via a laser camera 604, and then a reference image is obtained by an imaging plane 610 imaging. A reference depth between the reference plane 608 and the laser light 602 is L, which has been known. In an actual procedure for calculating depth information, the laser speckle emitted by laser light 602 may be reflected via the object 606, and the reflected light ray is collected by the laser camera 604, and then an actual speckle image is obtained by the imaging plane 610 imaging. Therefore, the calculation algorithm (1) of the actual depth information may be obtained as follows.

$$Dis = \frac{CD \times L \times f}{L \times AB + CD \times f},\qquad(1)$$

where L is the distance between the laser light 602 and the reference plane 608, f is a focal of a lens in the laser camera 604, CD is a distance between the laser light 602 and the laser camera 604, AB is an offset distance between an imaging of the object 606 and an imaging of the reference plane 608. AB may be a product of offset n of a pixel and an actual distance p of the pixel. When Dis between the object 606 and the laser light 602 is greater than distance L between the reference plane 608 and the laser light 602, AB is a negative value. When Dis between the object 606 and the laser light 602 is smaller than the distance L between the reference plane 608 and the laser light 602, AB is a positive value.

At block 506, the face recognition processing is performed on the first target image and the depth image by the face recognition model in the first operation environment.

After the depth image is obtained in the second operation environment, the obtained depth image may be sent to the first operation environment, and then the face recognition processing is performed on the first target image and the depth image in the first operation environment. A face recognition result in the first operation environment is sent to an upper-level application. The upper-level application may perform corresponding application operation according to the face recognition result.

For example, when face beauty processing is performed on an image, position and area where a face is located may be detected by the first target image. Since the first target image corresponds to the depth image, depth information of the face may be obtained by an area corresponding to the depth image, and a face three dimensional feature may be built by the depth information of the face, thus performing the face beauty processing on the face according to the face three dimensional feature.

In other embodiments provided by the present disclosure, performing the face recognition processing in the second operation environment includes actions at following blocks.

At block 702, a camera module is controlled to collect a second target image and a speckle image, and the second target image and the speckle image are sent to the second operation environment.

In an embodiment, the second target image may be an infrared image. The camera module may include a floodlight, a laser light, and a laser camera. The terminal may control the floodlight to be turned on, and then collet an infrared image formed by the floodlight illuminating an object via the laser camera as the second target image. The terminal may also control the laser light to be turned on, and then collect a speckle image formed by the laser light illuminating the object via the laser camera.

A time internal between a time point at which the second target image is collected and a time point at which the speckle image is collected is relatively short, which may ensure consistency of the collected second target image and the collected speckle image, avoid large errors between the second target image and the speckle image, and improve accuracy for processing the image. In detail, the camera module is controlled to collect the second target image, and the camera module is controlled to collect the speckle image. The time internal between a first time point at which the second target image is collected and a second time point at which the speckle image is collected is smaller than a first threshold.

A floodlight controller and a laser light controller may be provided respectively. The floodlight controller and the laser light controller may be coupled to two pulse width modulations (PWM). When there is a need to control the floodlight or the laser light to be turned on, pulses may be sent to the floodlight controller to control the floodlight to be turned on or may be sent to the laser light controller to control the laser light to be turned via the PWM, and the time internal between the time point at which the second target image is collected and the time point at which the speckle image is collected may be controlled by the PWMs sending respectively the pulses to the two controllers. It should be understood that, the second target image may be an infrared image, or other types of images, which is not limited herein. For example, the second target image may also be a visible light image.

At block 704, a calculation is performed on the speckle image in the second operation environment to obtain a depth image.

It should be noted that, when the security level of the face recognition instruction is greater than the level threshold, it is considered that the security level of an application operation initiating the face recognition instruction has a high requirement. Therefore, there is a need to perform the face recognition processing in an environment with a high security, which may ensure the security for processing data. The second target image and the speckle image collected by camera module may be sent to the second operation environment directly, and then the calculation is performed on the speckle image in the second operation environment to obtain the depth image.

At block 706, the face recognition processing is performed on the second target image and the depth image by the face recognition model in the second operation environment.

In an embodiment, when the face recognition processing is performed in the second operation environment, the face detection may be performed on the second target image, to detect whether there is a target face in the second target image. When there is the target face in the second target image, the detected target face is matched with the preset face. When the detected target face is matched with the present face, target depth information of the target face may be obtained according to the depth image, and it is detected whether the target face is biologically active according to the target depth information.

When the matching is performed on the target face, a face attribute feature of the target face may be extracted, and the extracted face attribute feature is matched with a face attribute feature of the preset face. When a matching value exceeds a matching threshold, it is considered that the face is matched successfully. For example, features such as a deflection angle, brightness information, and facial features of the face may be extracted as the face attribute features. When a matching degree between the face attribute feature of the target face and the face attribute feature of the preset face exceeds 90%, the matching of the face is considered successful.

In general, during face verification, it is assumed that a face in a photo or a face of a sculpture is captured, the extracted face attribute feature may also be verified successfully. In order to improve the accuracy, the living detection processing may be performed on the collected depth image. In this way, it is ensured that the verification is successful only when the collected face is a biologically active face. It may be understood that, the collected second target image may represent detailed information of the face, the collected depth image may represent corresponding depth information, and the living detection may be performed according to the depth image. For example, when the captured face is the face in the photo, it is determined that the collected face is not tridimensional according to the depth image, and it may be considered that the collected face is not the biologically active face.

In detail, performing the living detection on the depth image according to the corrected depth image includes: searching for face depth information corresponding to the target face in the depth image, and determining the target face to be the biologically active face when there is the face depth information corresponding to the target face in the above depth image and the face depth information conforms to a face tridimensional rule. The above face tridimensional rule is a rule with face three-dimensional depth information.

In an embodiment, artificial intelligent recognition may also be performed on the second target face and the depth image by employing an artificial intelligent model, to obtain a living body attribute feature corresponding to the target face, and it is determined whether the target face is the biologically active face according to the obtained living body attribute feature. The living body attribute feature may include a skin texture feature, a direction of the texture, a density of the texture, a width of the texture, and the like corresponding to the target face. When the living body attribute feature conforms to a face living rule, it is considered that the target face is biologically active, i.e., a biologically active face.

It should be understood that, when performing some processing such as face detection, face matching, living body detection and the like, the processing order may be adjusted based on needs. For example, the verification may be performed on the face firstly, and then it is detected whether the face is biologically active. It may also be detected whether the face is biologically active firstly, and then the verification is performed on the face.

With the method for processing data provided in the above embodiment, the face recognition model may be stored in the first operation environment, and the initialization is performed on the face recognition model in the first operation environment, and then the face recognition model subjected to the initialization is transmitted to the second operation environment from the share buffer. Since the storage space of the second operation environment is smaller than the storage space of the first operation environment, the initialization is performed on the face recognition model in the first operation environment, which may improve the efficiency for improving the initialization on the face recognition model, and reduce the resource occupancy rate in the second operation environment. The processing may be performed in the first operation environment or the second operation environment according to the security level of the face recognition instruction, which may avoid that all the applications are processed in the second operation environment, and reduce the resource occupation rate of the second operation environment.

It should be understood that, although respective steps in the flowcharts of FIG. 4, FIG. 6, FIG. 7, and FIG. 9 are sequentially displayed as indicated by the arrows, these steps are not necessarily performed in the order indicated by the arrows. Unless explicitly stated in this present disclosure, there is no strict order in which these steps may be executed, and these steps may be executed in any other order. Further, at least some of the steps in FIG. 4, FIG. 6, FIG. 7, and FIG. 9 may include multiple sub-steps or multiple stages. These sub-steps or stages are not necessarily performed at the same time, but may be executed at different time points. The execution order of these sub-steps or stages is not necessarily sequential, but may be performed in turn or alternately with at least a portion of other steps or sub-steps or stages of other steps.

Figure 10:
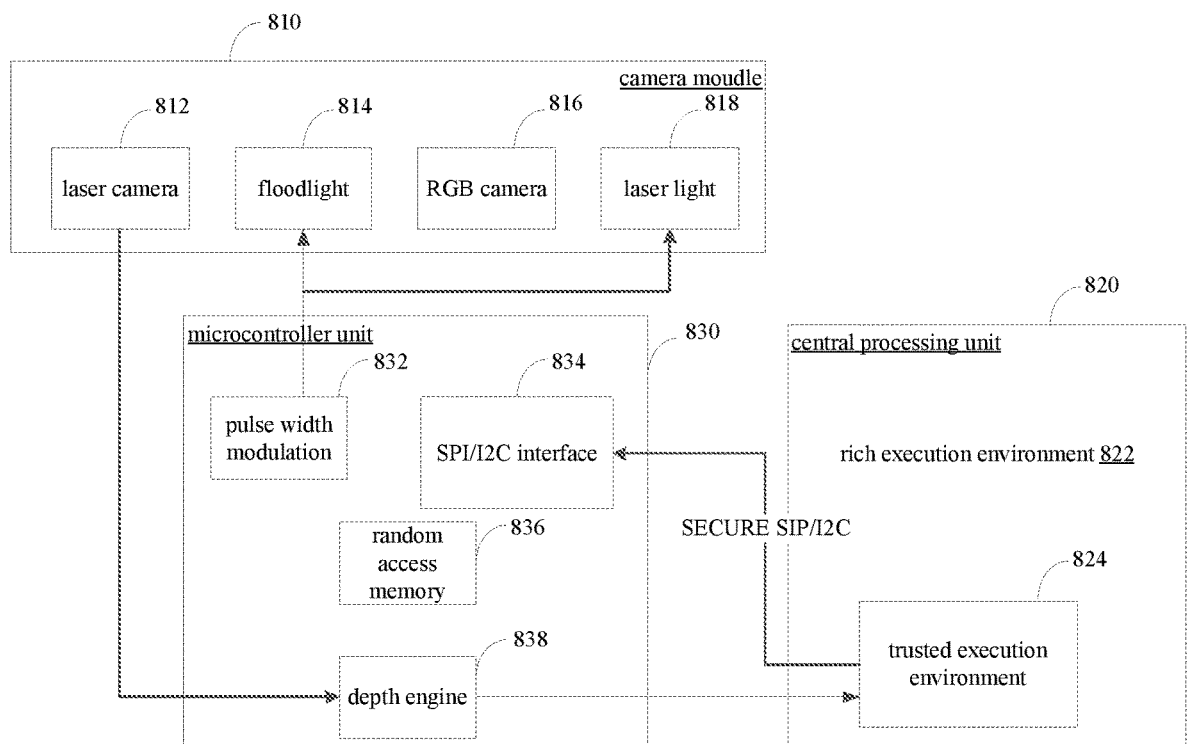
FIG. 10 is a block diagram illustrating hardware for implementing a method for processing data in an embodiment of the present disclosure.

FIG. 10 is a block diagram illustrating hardware for implementing a method for processing data in an embodiment. As illustrated in FIG. 10, the electronic device may include a camera module 810, a central processing unit (CPU) 820, and a microcontroller unit (MCU) 830. The camera module 810 includes a laser camera 812, a floodlight 814, a RGB camera 816 and a laser light 818. The MCU 830 includes a pulse width modulation (PWM) module 832, a serial peripheral interface/inter-integrated circuit (SPI/I2C) module 834, a random access memory (RAM) module 836, and a depth engine module 838. The central processing unit 820 may be in a multiple kernel operation mode. The CPU kernel in the central processing unit 820 may operate under a trusted execution environment (TEE) or under a rich execution environment (REE). Both the TEE and the REE are operation modes of an advanced RISC machines (ARM) module. The rich execution environment 822 in the central processing unit 820 may be the first operation environment with low security. The trusted execution environment 824 in the central processing unit 820 may be the second operation environment with high security. It should be understood that, the microcontroller unit 830 is a processing module independent on the central processing unit 820, and the input and output of the microcontroller unit 830 may be controlled by the central processing unit 820 under the TEE. The microcontroller unit 830 may also be a processing module with high security, and it may also be considered that the microcontroller unit 830 is in a safe operation environment, i.e., the second operation environment.

In general, an operation behavior with a high security level needs to be executed in the second operation environment, and other operation behavior may be executed in the first operation environment. In embodiments of the present disclosure, the central processing unit 820 may control a SECURE SPI/I2C to send the face recognition instruction to the SPI/I2C module 834 in the microcontroller unit 830 via the trusted execution environment 824. After the microcontroller unit 830 receives the face recognition instruction, when it is determined that the security level of the face recognition instruction is greater than the level threshold, the pulses is emitted via the PWM module to control the floodlight 814 in the camera module 810 to be turned on to collect the infrared image, and to control the laser light 818 in the camera module 810 to be turned on to collect the speckle image. The camera module 810 may transmit the collected infrared image and the speckle image to the depth engine module 838 in the microcontroller unit 830. The depth engine 838 may calculate the depth image according to the speckle image, and send the infrared image and the depth image to the trusted execution environment 824 of the central processing unit 820. The trusted execution environment 824 of the central processing unit 820 may perform the face recognition processing according to the received infrared image and the depth image.

When it is determined that the security level of the face recognition instruction is lower than the level threshold, the pulses is emitted via the PWM module 832 to control the laser light 818 in the camera module 810 to be turned on to collect the speckle image, and to control the RGB camera 816 to be turned on to collect the visible light image. The camera module 810 may send the collected visible light image to the rich execution environment 822 of the central processing unit 820 directly, and send the speckle image to the depth engine module 838 in the microcontroller unit 830. The depth engine module 838 may calculate the depth image according to the speckle image, and send the depth image to the trusted execution environment 824 of the central processing unit 820. Then the depth image is sent from the trusted execution environment 824 to the rich execution environment 822, and the face recognition processing is performed on the visible light image and the depth image in the rich execution environment 822.

Figure 11:
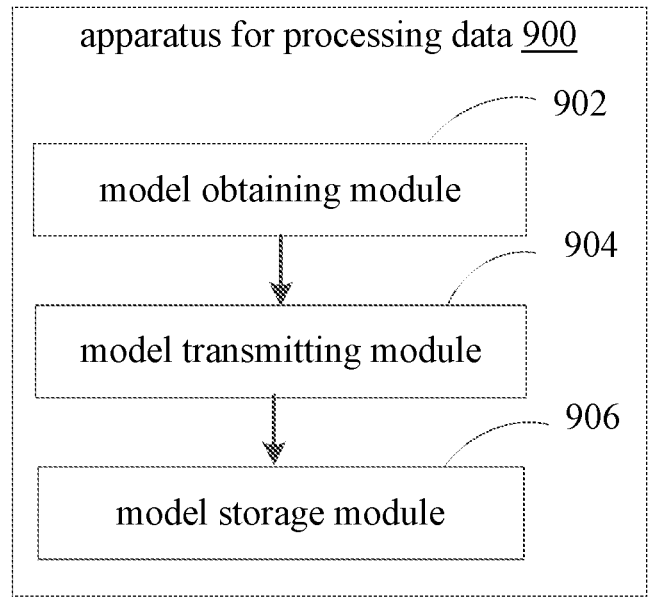
FIG. 11 and FIG. 12 are block diagrams illustrating apparatuses for processing data in embodiments of the present disclosure.

FIG. 11 is a block diagram illustrating an apparatus for processing data in an embodiment. As illustrated in FIG. 11, the apparatus 900 for processing data includes: a model obtaining module 902, a model transmitting module 904 and a model storage module 906.

The model obtaining module 902 is configured to obtain a face recognition model stored in a first operation environment.

The model transmitting module 904 is configured to perform the initialization on the face recognition model in the first operation environment, and to transmit the face recognition model subjected to the initialization to a share buffer.

The model storage module 906 is configured to transmit the face recognition model subjected to the initialization from the share buffer to the second operation environment for storing, in which, a storage space in the first operation environment is greater than a storage space in the second operation environment, and the face recognition model is configured to perform face recognition processing on an image. That is, a model total processing module includes the model transmitting module and the model storage module.

With the apparatus for processing data provided in the above embodiment, the face recognition model may be stored in the first operation environment, and the initialization is performed on the face recognition model in the first operation environment, and then the face recognition model subjected to the initialization is transmitted to the second operation environment from the share buffer. Since the storage space in the second operation environment is smaller than the storage space in the first operation environment, the initialization is performed on the face recognition model in the first operation environment, which may improve the efficiency for initializing the face recognition model and reduce a resource occupation rate in the second operation environment.

Figure 12:
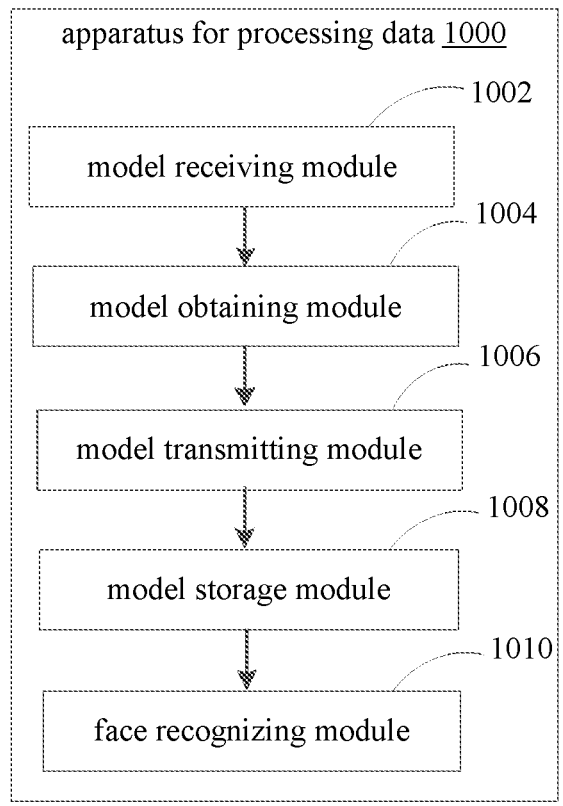

FIG. 12 is a block diagram illustrating an apparatus for processing data in an embodiment. As illustrated in FIG. 12, the apparatus 1000 includes a model receiving module 1002, a model obtaining module 1004, a first model transmitting module 1006, a first model storage module 1008 and a face recognition module 1010.

The model receiving module 1002 is configured to receive the face recognition model sent by a server from a terminal, and to store the face recognition model in the first operation environment of the terminal.

The model obtaining module 1004 is configured to obtain the face recognition model stored in the first operation environment when it is detected that the terminal restarts.

The model transmitting module 1006 is configured to perform the initialization on the face recognition model in the first operation environment, and to transmit the face recognition model subjected to the initialization to a share buffer.

The model storage module 1008 is configured to transmit the face recognition model subjected to the initialization from the share buffer to the second operation environment for storing, in which, a storage space in the first operation environment is greater than a storage space in the second operation environment, and the face recognition model is configured to perform face recognition processing on an image.

The face recognition module 1010 is configured to determine a security level of a face recognition instruction when the face recognition instruction is detected; to perform the face recognition processing according to the face recognition model in the first operation environment when the security level is lower than a level threshold; and to perform the face recognition processing according to the face recognition model in the second operation environment when the security level is higher than the level threshold, in which, a security level of the second operation environment is higher than a security level of the first operation environment.

With the apparatus for processing data provided in the above embodiment, the face recognition model may be stored in the first operation environment, and then the face recognition model subjected to the initialization is transmitted to the second operation environment from the share buffer after the initialization is performed on the face recognition model in the first operation environment. Since the storage space in the second operation environment is smaller than the storage space in the first operation environment, the initialization is performed on the face recognition model in the first operation environment, which may improve the efficiency for initializing the face recognition model and reduce a resource occupation rate in the second operation environment.

In an embodiment, the model transmitting module 1006 is further configured to perform encryption processing on the face recognition model subjected to the initialization, and to transmit the face recognition model subjected to the encryption processing to the share buffer.

In an embodiment, the model transmitting module 1006 is further configured to obtain remaining storage space in the second operation environment; and to perform the initialization on the face recognition model in the first operation environment when the remaining storage space is less than a space threshold, and to transmit the face recognition model subjected to the initialization to the share buffer.

In an embodiment, the model transmitting module 1006 is further configured to transmit the face recognition model to the share buffer when the remaining storage space exceeds or equals to the space threshold, and to transmit the face recognition model from the share buffer to the second operation environment.

In an embodiment, the model storage module 1008 is further configured to perform the initialization on the face recognition model in the second operation environment, to delete the face recognition model before the initialization, and to reserve the face recognition model after the initialization.

In an embodiment, the model storage module 1008 is further configured to transmit the face recognition model subjected to the encryption processing from the share buffer to the second operation environment for storing, and to perform decryption processing on the face recognition model subjected to the encryption processing in the second operation environment.

In an embodiment, the face recognition module 1010 is further configured to control a camera module to collect a first target image and a speckle image, to send the first target image to the first operation environment, and to send the speckle image to the second operation environment; to perform a calculation on the speckle image in the second operation environment to obtain a depth image, and to send the depth image to the first operation environment; and to perform the face recognition processing on the first target image and the depth image by the face recognition model in the first operation environment.

In an embodiment, the face recognition module 1010 is further configured to control a camera module to collect a second target image and a speckle image, and to send the second target image and the speckle image to the second operation environment; to perform a calculation on the speckle image in the second operation environment to obtain a depth image; and to perform the face recognition processing on the second target image and the depth image by the face recognition model in the second operation environment.

The above division of respective modules in the apparatus for processing data is only used for illustration. In other embodiment, the apparatus for processing data may be divided into different modules as needed to perform all or part of the functions of the above apparatus for processing data.

Second Implementation:

FIG. 3 is a schematic diagram illustrating an internal structure of an electronic device in an embodiment. As illustrated in FIG. 3, the electronic device 100 includes a processor 110, a memory 120 and a network interface 130 which are coupled via a system bus 140. The processor 110 is configured to provide computing and controlling ability to support operation of the entire electronic device 100. The memory 120 is configured to store data, programs and the like. The memory 120 has at least one computer program 1224 stored thereon. The computer program 1224 may be configured to implement a method for processing data provided in embodiments of the present disclosure when executed by the processor 110. The memory 120 may include a non-volatile storage medium such as a magnetic disk, an optical disk, a read-only memory (ROM), or a random storage memory (RAM). For example, in an embodiment, the memory 120 includes a non-volatile storage medium 122 and an internal memory 124. The non-volatile storage medium 122 has an operating system 1222 and a computer program 1224 stored thereon. The computer program 1224 is configured to implement a method for processing data provided in embodiments of the present disclosure when executed by the processor 110. The internal memory 124 provides a cached operation environment for the operating system 1222 and the computer program 1224 in the non-volatile storage medium 122. The network interface 130 may be an Ethernet card or a wireless network card or the like for communicating with the external electronic device 100. The electronic device 100 may be a phone, a tablet, a personal assistant, a wearable device or the like.

Figure 13:
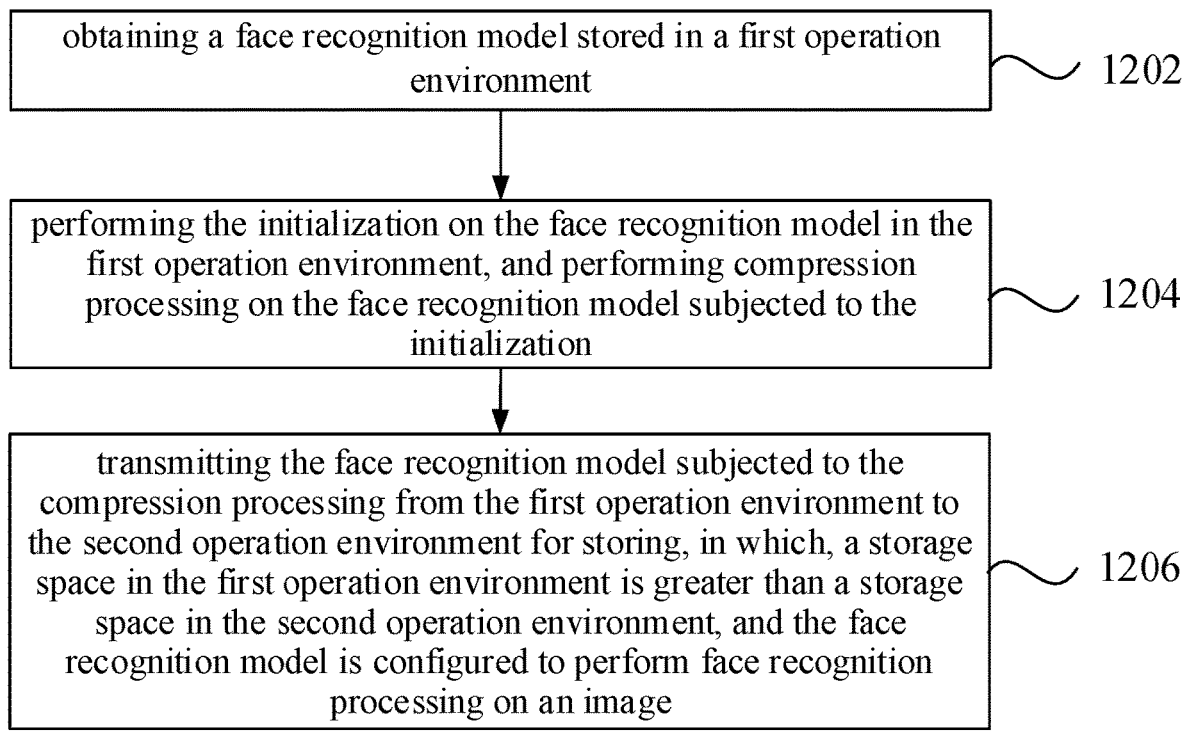
FIG. 13 and FIG. 14 are flow charts illustrating methods for processing data in embodiments of the present disclosure.

FIG. 13 is a flow chart illustrating a method for processing data in an embodiment. As illustrated in FIG. 13, the method for processing data includes actions at following block 2202 to block 2206.

At block 2202, a face recognition model stored in a first operation environment is obtained.

In detail, the electronic device may include a processor. The processor may perform processing such as storing, computing and transmission on data. The processor in the electronic device may operate in different environments. For example, the processor may operate in a TEE (trusted execution environment), or may operate in a REE (rich execution environment). When the processor operates in the TEE, the security of data is higher. When the processor operates in the REE, the security of data is lower.

The electronic device may allocate resources of the processor and divide different resources for different operation environments. For example, in common circumstances, there are fewer processes with higher security requirements in the electronic device, and there are more common processes. Therefore, the electronic device may divide a small part of the resources of the processor into an operation environment with higher security, and divide most of the resources of the processor into an operation environment with lower security.

The face recognition model is an algorithm model for performing face recognition in an image, which is stored generally in form of a file. It may be understood that, since an algorithm for performing the face recognition in the image is complex, a storage space occupied by a stored face recognition model is large. After the electronic device divides the resources of the processor into different operation environments, a divided storage space in the first operation environment is greater than a divided storage space in the second operation environment. Therefore, the electronic device may store the face recognition model in the first operation environment, to ensure that there is enough space in the second operation environment to perform processing on data.

At block 2204, the initialization is performed on the face recognition model in the first operation environment, and compression processing is performed on the face recognition model subjected to the initialization.

It should be understood that, before the face recognition processing is performed on the image, there is a need to perform the initialization on the face recognition model. When the face recognition model is stored in the second operation environment, the storage space in the second operation environment needs to be occupied for storing the face recognition model. Performing the initialization on the face recognition model also needs to occupy the storage space in the second operation environment. In this way, there will be large resource consumption in the second operation environment, which affects the efficiency for processing data.

For example, the face recognition model occupies a space of 20 M in the memory, and performing the initialization on the face recognition model needs additional 10 M in the memory. When storing and the initialization are performed on the face recognition model simultaneously, 30 M in the memory of the second operation environment is needed. However, when the face recognition model is stored in the first operation environment and initialized in the first operation environment, and then the face recognition model subjected to the initialization is sent to the second operation environment, only 10 M in the memory of the second operation environment needs to be occupied, which greatly reduces the resource occupancy rate in the second operation environment.

The electronic device stores the face recognition model in the first operation environment, and performs the initialization on the face recognition model in the first operation environment, and then transmits the face recognition model subjected to the initialization to the second operation environment, thus reducing occupancy of the storage space in the second operation environment. After the initialization is performed on the face recognition model, the compression may further be performed on the face recognition model subjected to the initialization, and then the compressed face recognition model is sent to the second operation environment for storing, which may further reduce the resource occupancy in the second operation environment, and improve velocity for processing data.

At block 2206, the face recognition model subjected to the compression processing is transmitted from the first operation environment to the second operation environment for storing, in which, the storage space of the first operation environment is greater the storage space in the second operation environment, and the face recognition model is configured to perform face recognition processing on an image. That is, performing the initialization on the face recognition model in the first operation environment and transmitting the face recognition model subjected to the initialization to the second operation environment for storing include: performing the initialization on the face recognition model in the first operation environment, and performing the compression processing on the face recognition model subjected to the initialization; and transmitting the face recognition model subjected to the compression processing from the first operation environment to the second operation environment for storing, in which, the face recognition model is configured to perform face recognition processing on an image.

In an embodiment, the actions at block 2202 may be executed when it is detected that an initialization condition is met. For example, the face recognition model is stored in the first operation environment, and the electronic device may perform the initialization on the face recognition model when turned on, may also perform the initialization on the face recognition model when it is detected that an application needing to perform the face recognition processing is turned on, and may also perform the initialization on the face recognition model when a face recognition instruction is detected, and then the face recognition model subjected to the initialization is compressed and transmitted to the second operation environment.

In other embodiments provided by the present disclosure, before performing the initialization on the face recognition model in the first operation environment, remaining storage space in the second operation environment may be obtained; the initialization is performed on the face recognition model in the first operation environment when the remaining storage space is less than a space threshold, and the compressing is performed on the face recognition model subjected to the initialization. The space threshold may be set as needs, which generally is a sum of a storage space occupied by the face recognition model and a storage space occupied by the face recognition model during initialization.

When the remaining storage space in the second operation environment is large, the face recognition model may be sent to the second operation environment directly, and the initialization is performed the face recognition model in the second operation environment, and then the original face recognition model is deleted after the initialization. In this way, security of data may be ensured. The method for processing data described above may also include: when the remaining storage space is greater than or equal to the space threshold, performing the compression processing on the face recognition model in the first operation environment, transmitting the face recognition model subjected to the compression processing to the second operation environment; performing the initialization on the face recognition model subjected to the compression processing in the second operation environment, deleting the face recognition model before the initialization, and reserving the face recognition model after the initialization.

It should be understood that, the face recognition model generally includes a plurality of processing modules. Respective processing modules perform different processing. The plurality of modules may be independent with each other. For example, the plurality of modules may be a face detection module, a face matching module and a living body detection module. A part of processing modules may have lower requirement for security, and a part of processing modules may have higher requirement for security. Therefore, the processing modules with lower security may be initialized in the first operation environment, and the processing modules with higher security may be initialized in the second operation environment.

In detail, the action at block 2204 may include: performing a first initialization on a first module in the face recognition model in the first operation environment, and performing compression processing on the face recognition model subjected to the first initialization. After the actions at block 2206, the method may include: performing a second initialization on a second model in the face recognition model subjected to the compression processing. The second model is a module other than the first model in the face recognition model. The security of the first model is lower than the security of the second model. For example, the first model may be a face detection model, and the second model may be a face matching model and a living body detection model. Since the first model has a low requirement for the security, the initialization is performed on the first model in the first operation environment. Since the second model has a higher requirement for the security, the initialization is performed on the second model in the second operation environment.

With the method for processing data provided in the above embodiment, the face recognition model may be stored in the first operation environment, and then the face recognition model subjected to the compression processing is transmitted to the second operation environment after the compression processing is performed on the face recognition model in the first operation environment. Since the storage space in the second operation environment is smaller than the storage space in the first operation environment, performing the initialization on the face recognition model in the first operation environment may improve the efficiency for initializing the face recognition model, reduce a resource occupation rate in the second operation environment, and improve the velocity for processing data. Meanwhile, the face recognition model subjected to the compression processing is sent to the second operation environment, which may further improve the velocity for processing data.

Figure 14:
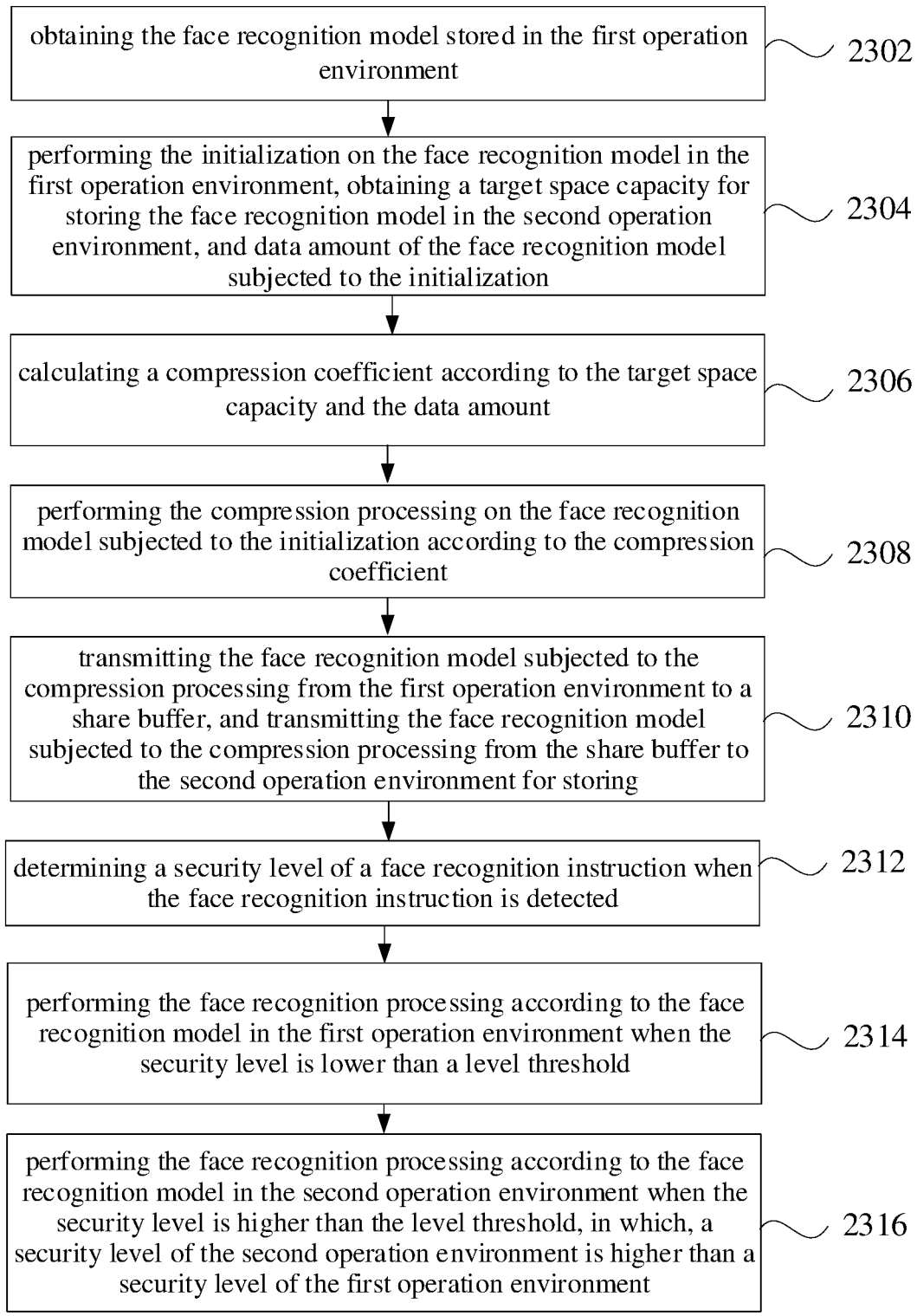

FIG. 14 is a flow chart illustrating a method for processing data in an embodiment. As illustrated in FIG. 14, the method for processing data includes actions at block 2302 to block 2316.

At block 2302, a face recognition model stored in a first operation environment is obtained.

In general, before performing face recognition, training is performed on the face recognition model, such that the face recognition model has higher recognition accuracy. During performing the training on the face recognition model, a training image set may be obtained, an image in the training image set is taken as an input of the face recognition model, and a training parameter of the face recognition model is adjusted constantly according to a training result obtained during training, to obtain an optimum parameter of the face recognition model. The more images are included in the training image set, the more accurate the face recognition model obtained by training will be, but time consumption will increase accordingly.

In an embodiment, the electronic device may be a terminal interacting with a user. However, since resources in the terminal are limited, the training is performed on the face recognition model in the server. The server may send the trained face recognition model to the terminal after performing the training on the face recognition model. The terminal may store the trained face recognition model in the first operation environment after receiving the trained face recognition model. Before the actions at block 2302, the method further includes: receiving, by a terminal, the face recognition model sent by a server, and storing the face recognition model in the first operation environment of the terminal.

The terminal may include the first operation environment and the second operation environment. The terminal may perform the face recognition processing on an image in the second operation environment. However, since the storage space divided into the first operation environment by the terminal is greater than the storage space divided into the second operation environment, the terminal may store the received face recognition model in the storage space of the first operation environment. In an embodiment, when it is detected that the terminal is restarted every time, the face recognition model stored in the first operation environment is loaded to the second operation environment. In this way, the loaded face recognition model in the second operation environment may be invoked directly for processing when there is a need to perform the face recognition processing on the image. The actions at block 2302 may include: obtaining the face recognition model stored in the first operation environment when it is detected that the terminal is restarted.

It should be understood that, the face recognition model may be updated. When the face recognition model is updated, the server may send the updated face recognition model to the terminal. The terminal stores the updated face recognition model in the first operation environment to cover the original face recognition model after receiving the updated face recognition model. Then the terminal is controlled to restart. The updated face recognition model may be obtained after the terminal is restarted, and the initialization is performed on the updated face recognition model.

At block 2304, the initialization is performed on the face recognition model in the first operation environment, and a target space capacity for storing the face recognition model in the second operation environment and data amount of the face recognition model subjected to the initialization are obtained.

There is a need to perform the initialization on the face recognition model before performing the face recognition processing on the face recognition model. During the initialization, parameters, modules and the like in the face recognition model may be set as a default state. Since performing the initialization on the face recognition model also needs to occupy the memory, the terminal may perform the initialization on the face recognition model in the first operation environment, and then send the face recognition model subjected to the initialization to the second operation environment. In this way, the face recognition processing may be directly performed on the face recognition model in the second operation environment and does not need to occupy additional memory to perform the initialization on the face recognition model.

After the initialization is performed on the face recognition model, the compression processing is further performed on the face recognition model subjected to the initialization. In detail, the target space capacity for storing the face recognition model in the second operation environment and the data amount of the face recognition model subjected to the initialization may be obtained, and the compression processing is performed on the target space capacity and the data amount. It should be noted that, a storage space specific to storing the face recognition model may be demarcated in the second operation environment, so that other data may not occupy the storage space. The target space capacity is a capacity of only this storage space specific to storing the face recognition model. The data amount of the face recognition model refers to a size of data of the face recognition model.

At block 2306, a compression coefficient is calculated according to the target space capacity and the data amount.

The compression coefficient may be calculated according to the target space capacity and the data amount, and then the compression processing is performed on the face recognition model according to the calculated compression coefficient. When the target space capacity is lower than the data amount, it is illuminated that there is not enough storage space in the second operation environment for storing the face recognition model. Then the corresponding compression processing may be performed on the face recognition model according to the target space capacity and the data amount, and the face recognition model subjected to the compression processing is stored in the second operation environment.

In an embodiment, steps for calculating the compression coefficient may include: determining a ratio of the target space capacity to the data amount as the compression coefficient when the target space capacity is smaller than the data amount. For example, when the target space amount is 20M, and the data amount of the face recognition model is 31.5 M, the compression coefficient is 31.5/20=1.575, that is, the face recognition model is compressed by 1.575 times. When the target space capacity is greater than or equal to the data amount, in order to improve a velocity for transmitting data, the compression processing may be performed on the face recognition model according to the compression coefficient, and the compression processing may also not be performed on the face recognition model, which is not limited herein.

At block 2308, the compression processing corresponding to the compression coefficient may be performed on the face recognition model subjected to the initialization.

After the compression coefficient is obtained, the compression processing may be performed on the face recognition model subjected to the initialization according to the compression coefficient, the face recognition model subjected to the compression processing may be stored in the second operation environment. It should be understood that, once the face recognition model is compression, the corresponding accuracy of the face recognition processing will be reduced, such that the accuracy for recognizing may not be ensured. Therefore, in order to ensure the accuracy for the face recognition, a maximum compression limit may be set, and the compression processing on the face recognition model may not exceed the maximum compression limit.

In an embodiment, a compression threshold may be set. When a compression coefficient is greater than the compression threshold, it is considered that the face recognition processing with a lower accuracy is performed on the face recognition model subjected to the compression processing. In detail, actions at block 2308 may include: when the compression coefficient is smaller than the compression threshold, the compression processing corresponding to the compression coefficient is performed on the face recognition model subjected to the initialization. When the compression coefficient is greater than or equal to the compression threshold, the compression processing corresponding to the compression threshold is performed on the face recognition model subjected to the initialization. After the compression processing is performed according to the compression threshold, the electronic device may reallocate a storage space for storing the face recognition model subjected to the compression processing in the second operation environment according to the data size of the face recognition model subjected to the compression processing.

Figure 15:
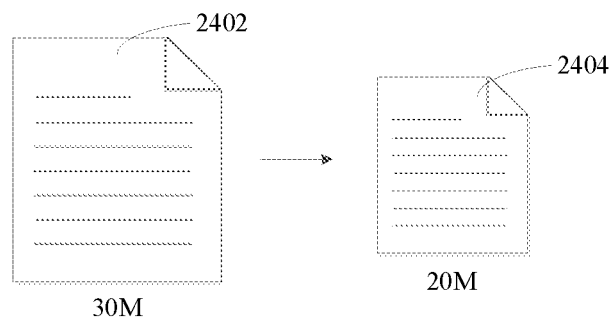
FIG. 15 is a schematic diagram illustrating a system for implementing a method for processing data in an embodiment of the present disclosure.

FIG. 15 is a schematic diagram illustrating performing compression processing on the face recognition model in an embodiment. As illustrated in FIG. 15, the face recognition model 2402 may be stored in form of a file, which is 30 M in total. After the compression processing is performed on the face recognition model 2402, a compressed face recognition model 2404 is formed. The compressed face recognition model 2404 may be stored in form of files, which is 20 M in total.

At block 2310, the face recognition model subjected to the compression processing is transmitted from the first operation environment to a share buffer, and the face recognition model subjected to the compression processing is transmitted from the share buffer to the second operation environment for storing.

The share buffer is a channel for transmitting data between the first operation environment and the second operation environment. The first operation environment and the second operation environment may access the share buffer. It should be noted that, the electronic device may perform configuration on the share buffer, and may set a size of a storage space of the share buffer based on needs. For example, the electronic device may set the size of the storage space of the share buffer to 5 M, or 10 M.

FIG. 5 is a schematic diagram illustrating a system for implementing a method for processing data in an embodiment. As illustrated in FIG. 5, the system includes a first operation environment 302, a share buffer 304 and a second operation environment 306. The first operation environment 302 and the second operation environment 306 may perform data transmission via the share buffer 304. The face recognition model is stored in the first operation environment 302. The system may obtain the face recognition mode stored in the first operation environment 302, perform the initialization on the obtained face recognition model, perform the compression processing on the face recognition model subjected to the initialization, and then transmit the face recognition model subjected to the compression processing to the share buffer 304. The face recognition model subjected to the initialization is transmitted to the second operation environment 306 via the share buffer 304.

At block 2312, a security level of a face recognition instruction is determined when the face recognition instruction is detected.

Both the first operation environment and the second operation environment have the face recognition model stored thereon. The terminal may perform the face recognition processing in the first operation environment, and may also perform the face recognition processing in the second operation environment. In detail, the terminal may determine that the face recognition processing is performed in the first operation environment or in the second operation environment according to the face recognition instruction for triggering the face recognition processing.

The face recognition instruction is initiated by an upper-level application of the terminal. The upper-level application may write information such as time at which the face recognition instruction is sent, an application marker and an operation marker to the face recognition instruction. The application marker may be used to mark an application that initiates the face recognition instruction. The operation marker may be used to mark an application operation which needs to be performed by a face recognition result. For example, an application operation such as payment, unlocking or face beauty on an image may be performed by the face recognition result, and the operation marker in the face recognition instruction is configured to mark the application operation such as the payment, the unlocking or the face beauty on the image.

The security level is used to represent the security of the application operation. The higher the security level, the higher the security requirement of the application operation is. For example, the payment operation has a high requirement for the security, and the face beauty on the image has a lower requirement for the security, so the security level of the payment operation is higher than the security level of the face beauty on the image. The security level may be written to the face recognition instruction. The terminal may directly read the security level in the face recognition instruction after detecting the face recognition instruction. The terminal may also establish a corresponding relationship of the operation marker in advance, and obtain a corresponding security level by the operation marker in the face recognition instruction after detecting the face recognition instruction.

At block 2314, the face recognition processing is performed according to the face recognition model in the first operation environment when the security level is lower than a level threshold.

When it is detected that the security level is lower than the level threshold, it is considered that the application operation initiating the face recognition processing has a lower requirement for the security, and the face recognition processing may be performed directly according to the face recognition model in the first operation environment. In detail, the face recognition processing may include, but be not limited to, one or more of face detection, face matching and living body detection. The face detection refers to detect whether there is a face in an image. The face matching refers to match the detected face with a preset face. The living body detection refers to detect whether the face in the target image is biologically active.

At block 2316, the face recognition processing is performed according to the face recognition model in the second operation environment when the security level is higher than the level threshold, in which, a security level of the second operation environment is higher than a security level of the first operation environment.

When it is detected that the security level is higher than the level threshold, it is considered that the application operation initiating the face recognition processing has a higher requirement for the security, and the face recognition processing may be performed according to the face recognition model in the second operation environment. In detail, the terminal may send the face recognition instruction to the second operation environment, and control a camera module to collect an image in the second operation environment. The collected image may be sent to the second operation environment firstly, and the security level of the application operation is determined in the second operation environment. When the security level is lower than the level threshold, the collected image is sent to the first operation environment for performing the face recognition processing. When the security level is higher than the level threshold, the face recognition processing is performed on the collected image in the second operation environment.

In detail, as illustrated in FIG. 7, when the face recognition processing is performed in the first operation environment, the method includes actions at following blocks.

At block 502, a camera module is controlled to collect a first target image and a speckle image, the first target image is sent to the first operation environment, and the speckle image is sent to the second operation environment.

An application installed in the terminal may initiate a face recognition instruction, and the face recognition instruction is sent to the second operation environment. When it is detected that the security level of the face recognition instruction is lower than the level threshold, the camera module may be controlled to collect the first target image and the speckle image. The first target image collected by the camera module may be sent to the first operation environment directly, and the collected speckle image may be sent to the second operation environment.

In an embodiment, the first target image may be a visible light image, or other types of images, which is not limited herein. When the first target image is the visible light image, the camera module may include a red green blue (RGB) camera, and the first target image may be collected via the RGB camera. The camera module may also include a laser light and a laser camera. The terminal may control the laser light to be turned on, and then collect a speckle image formed by laser speckles emitted by the laser light collected by the laser camera.

In detail, when a laser illuminates on optical roughness surfaces with an average fluctuation greater than a wavelength of an order of magnitude, wavelets scattered by randomly distributed face elements on these surfaces overlap each other, such that a reflected light field has a random spatial intensity distribution, and a structure with a granular structure is presented, which is a laser speckle. The formed laser speckle has a high randomness. Therefore, lasers emitted by different laser transmitters generate different laser speckles. When the formed laser speckles are emitted on objects with different depths and shapes, the generated speckle images are different. The laser speckles formed by the different laser lights are unique, such that the obtained speckle images are also unique.

At block 504, a calculation is performed on the speckle image in the second operation environment to obtain a depth image, and the depth image is sent to the first operation environment.

In order to protect the security of the data, the terminal may ensure that the speckle image is always processed in a safe environment. Therefore, the terminal will transmit the speckle image to the second operation environment for processing. The depth image is used to represent depth information of a captured object, and may be obtained according to the speckle image. The terminal may control the camera module to collect the first target image and the speckle image simultaneously. The depth image obtained according to the speckle image may represent the depth information of the object in the first target image.

The depth image may be obtained according to the speckle image and a reference image in the second operation environment. The depth image is collected when the laser speckle is illuminated to the reference plane. Therefore, the reference image has reference depth information thereon. Firstly, an opposing depth is calculated according to offsets of positions of speckle points in the speckle image relative to positions of the speckle points in the reference image. The opposing depth may represent depth information between an actual captured object and the reference plane. Then, actual depth information of the object may be calculated according to the obtained opposing depth and the reference depth. In detail, the reference image is compared with the speckle image to obtain offset information. The offset information is used to represent horizontal offset of the speckle points in the speckle image relative to the corresponding speckle points in the reference image. The depth image is obtained according to the offset information and the reference depth information.

FIG. 8 is a schematic diagram illustrating calculation of depth information in an embodiment. As illustrated in FIG. 8, the laser light 602 may generate a laser speckle. A formed image may be obtained via the laser camera 604 after the laser speckle is reflected by an object. During calibration of a camera, the laser speckle emitted by the laser light 602 may be reflected by a reference plane 608, and a reflected light ray is collected via a laser camera 604, and then a reference image is obtained by an imaging plane 610 imaging. A reference depth between the reference plane 608 and the laser light 602 is L, which is a known value. In an actual procedure for calculating depth information, the laser speckle emitted by laser light 602 may be reflected via the object 606, and the reflected light ray is collected by the laser camera 604, and then an actual speckle image is obtained by the imaging plane 610 imaging. Therefore, the calculation algorithm (1) of the actual depth information may be obtained as follows.

$$Dis = \frac{CD \times L \times f}{L \times AB + CD \times f}, \quad (1)$$

where L is the distance between the laser light 602 and the reference plane 608, f is a focal of a lens in the laser camera 604, CD is a distance between the laser light 602 and the laser camera 604, AB is an offset distance between an imaging of the object 606 and an imaging of the reference plane 608. AB may be a product of offset n of a pixel and an actual distance p of the pixel. When Dis between the object 606 and the laser light 602 is greater than distance L between the reference plane 608 and the laser light 602, AB is a negative value. When Dis between the object 606 and the laser light 602 is smaller than the distance L between the reference plane 608 and the laser light 602, AB is a positive value.

At block 506, the face recognition processing is performed on the first target image and the depth image by the face recognition model in the first operation environment.

After the depth image is obtained in the second operation environment, the obtained depth image may be sent to the first operation environment, and then the face recognition processing is performed on the first target image and the depth image in the first operation environment. Then a face recognition result in the first operation environment is sent to an upper-level application. The upper-level application may perform corresponding application operation according to the face recognition result.

For example, when face beauty processing is performed on an image, position and area where a face is located may be detected by the first target image. Since the first target image corresponds to the depth image, depth information of the face may be obtained by an area corresponding to the depth image, and a face three dimensional feature may be built by the depth information of the face, thus performing the face beauty processing on the face according to the face three dimensional feature.

Figure 9:
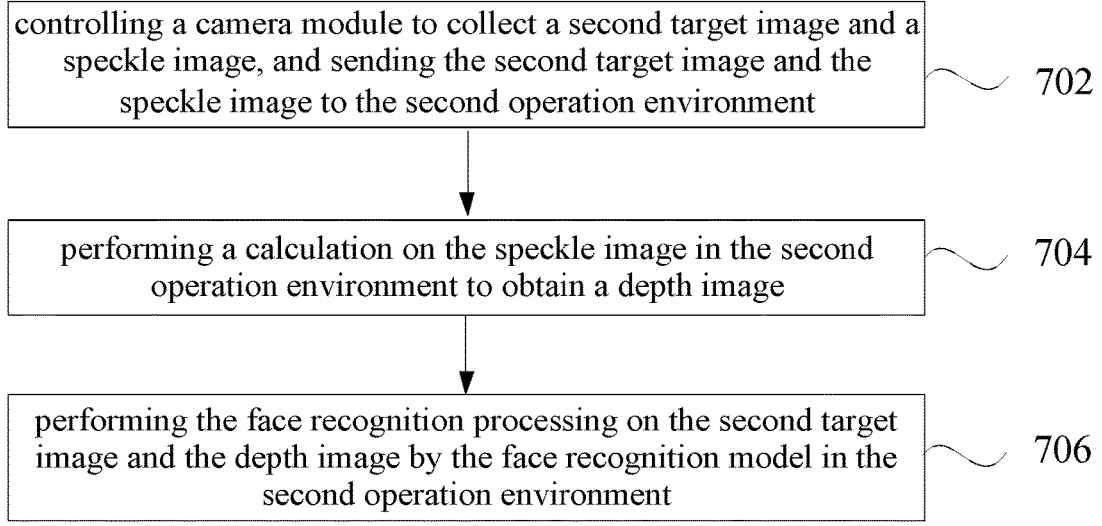
FIG. 9 is a flow chart illustrating a method for processing data in an embodiment of the present disclosure.

In other embodiments provided by the present disclosure, as illustrated in FIG. 9, performing the face recognition processing in the second operation environment includes actions at following blocks.

At block 702, a camera module is controlled to collect a second target image and a speckle image, and the second target image and the speckle image are sent to the second operation environment.

In an embodiment, the second target image may be an infrared image. The camera module may include a floodlight, a laser light, and a laser camera. The terminal may control the floodlight to be turned on, and then collet an infrared image formed by the floodlight illuminating an object via the laser camera as the second target image. The terminal may also control the laser light to be turned on, and then collect a speckle image formed by the laser light illuminating the object via the laser camera.

A time internal between a time point at which the second target image is collected and a time point at which the speckle image is collected is relatively short, which may ensure consistency of the collected second target image and the collected speckle image, avoid that there are large errors between the second target image and the speckle image, and improve accuracy for processing the image. In detail, the camera module is controlled to collect the second target image, and the camera module is controlled to collect the speckle image. The time internal between a first time point at which the second target image is collected and a second time point at which the speckle image is collected is smaller than a first threshold.

A floodlight controller and a laser light controller may be provided respectively. The floodlight controller and the laser light controller may be coupled to two pulse width modulations (PWM). When there is a need to control the floodlight or the laser light to be turned on, pulses may be sent to the floodlight controller to control the floodlight to be turned on or may be sent to the laser light controller to control the laser light to be turned via the PWM, and the time internal between the time point at which the second target image is collected and the time point at which the speckle image is collected may be controlled by the PWMs respectively sending the pulses to the two controllers. It should be understood that, the second target image may be an infrared image, or other types of images, which is not limited herein. For example, the second target image may also be a visible light image.

At block 704, a calculation is performed on the speckle image in the second operation environment to obtain a depth image.

It should be noted that, when the security level of the face recognition instruction is higher than the level threshold, it is considered that an application operation initiating the face recognition instruction has a high requirement for the security level. Therefore, there is a need to perform the face recognition processing in an environment with a high security, which may ensure the security for processing data. The second target image and the speckle image collected by camera module may be sent to the second operation environment directly, and then the depth image is calculated according to the speckle image in the second operation environment.

At block 706, the face recognition processing is performed on the second target image and the depth image by the face recognition model in the second operation environment.

In an embodiment, when the face recognition processing is performed in the second operation environment, the face detection may be performed on the second target image, to detect whether there is a target face in the second target image. When there is the target face in the second target image, the detected target face is matched with the preset face. When the detected target face is matched with the present face, target depth information of the target face may be obtained according to the depth image, and it is detected whether the target face is biologically active according to the target depth information.

When the matching is performed on the target face, a face attribute feature of the target face may be extracted, and the extracted face attribute feature is matched with a face attribute feature of the preset face. When a matching value exceeds a matching threshold, it is considered that the face is matched successfully. For example, features such as a deflection angle, brightness information, and facial features of the face may be extracted as the face attribute features. When a matching degree between the face attribute feature of the target face and the face attribute feature of the preset face exceeds 90%, the matching of the face is considered successful.

In general, during face verification, it is assumed that a face in a photo or a face of a sculpture is captured, the extracted face attribute feature may also be verified successfully. In order to improve the accuracy, the living detection processing may be performed on the collected depth image. In this way, it is ensured that the verification is successful only when the collected face is a biologically active face. It may be understood that, the collected second target image may represent detailed information of the face, the collected depth image may represent corresponding depth information, and the living detection may be performed according to the depth image. For example, when the captured face is the face in the photo, it is determined that the collected face is not tridimensional according to the depth image, and it may be considered that the collected face is not the biologically active face.

In detail, performing the living detection on the depth image includes: searching for face depth information corresponding to the target face in the depth image, and determining the target face to be the biologically active face when there is the face depth information corresponding to the target face in the above depth image and the face depth information conforms to a face tridimensional rule. The above face tridimensional rule is a rule with face three-dimensional depth information.

In an embodiment, artificial intelligent recognition may also be performed on the second target face and the depth image by employing an artificial intelligent model, to obtain a living body attribute feature corresponding to the target face, and it is determined whether the target face is the biologically active face according to the obtained living body attribute feature. The living body attribute feature may include a skin texture feature, a direction of the texture, a density of the texture, a width of the texture, and the like corresponding to the target face. When the living body attribute feature conforms to a face living rule, it is considered that the target face is biologically active, i.e., a biologically active face.

It should be understood that, when some processing such as face detection, face matching, living body detection and the like are performed, the processing order may be adjusted as needs. For example, the verification may be performed on the face firstly, and then it is detected whether the face is biologically active. It may also be detected whether the face is biologically active firstly, and then the verification is performed on the face.

In embodiments provided by the present disclosure, in order to ensure the security of data, when the face recognition model is transmitted, the encryption processing may be performed on the face recognition model subjected to the compression processing, and the face recognition model subjected to the encryption processing is transmitted from the first operation environment to the second operation environment; decryption processing is performed on the face recognition model subjected to the encryption processing in the second operation environment, and the face recognition model subjected to the decryption processing is stored.

The first operation environment may be a common operation environment, the second operation environment may be a safe operation environment, and the security of the second operation environment is higher than the security of the first operation environment. The first operation environment is generally configured to perform processing on application operations with lower security requirement, and the second operation environment is generally configured to perform processing on application operations with higher security requirement. For example, operations with lower security such as photographing and games may be performed in the first operation environment, and operations with higher security such as payment and unlocking may be performed in the second operation environment.

The second operation environment is generally configured to perform application operations with high security requirement. Therefore, when the face recognition model is sent to the second operation environment, there is a need to ensure the security of the face recognition model. After the compression is performed on the face recognition model in the first operation environment, the encryption processing may be performed on the face recognition model subjected to the compression, and then the face recognition model subjected to the encryption processing is sent from the share buffer to the second operation environment.

The face recognition model after the encryption processing is transmitted from the share buffer to the second operation environment after being transmitted from the first operation environment to the share buffer. The second operation environment performs decryption processing on the received face recognition model subjected to the encryption processing. Algorithms for performing the encryption processing on the face recognition model are not limited in this embodiment. For example, the encryption processing may be performed according to the encryption algorithm such as data encryption standard (DES), message-digest algorithm 5 (MD5), diffie-hellman (HAVAL) and the like.

In an embodiment, after generating the face recognition model in the second operation environment, the method may also include: when it is detected that a time period when the face recognition model is not invoked exceeds a time threshold, or it is detected that the terminal is turned off, the face recognition model in the second operation environment is deleted. In this way, the storage space of the second operation environment may be released, to save the space of the electronic device.

Further, the operating condition of the electronic device may be detected when the electronic device is operating, and the storage space occupied by the face recognition model may be released according to the operating condition of the electronic device. In detail, when it is detected that the electronic device is in a stuck state, and the time period when the face recognition model is not invoked exceeds the time threshold, the face recognition model in the second operation environment is deleted.

After the storage space occupied by the face recognition model is released, when it is detected that the electronic device returns to a normal operation, or when a face recognition instruction is detected, the face recognition model stored in the first operation environment may be obtained; the initialization is performed on the face recognition model in the first operation environment, and compression processing is performed on the face recognition model subjected to the initialization; and the face recognition model subjected to the compression processing is transmitted from the first operation environment to the second operation environment for storing.

With the method for processing data provided in the above embodiment, the face recognition model may be stored in the first operation environment, and the initialization is performed on the face recognition model in the first operation environment, and then the face recognition model after the initialization is transmitted to the second operation environment. Since the storage space of the second operation environment is smaller than the storage space of the first operation environment, the initialization is performed on the face recognition model in the first operation environment, which may improve the efficiency for improving the initialization on the face recognition model, reduce the resource occupancy rate in the second operation environment, and improve the velocity for processing data. In addition, the processing may be performed in the first operation environment or in the second operation environment according to the security level of the face recognition instruction, which may avoid that all the applications are processed in the second operation environment, and reduce the resource occupation rate of the second operation environment.

It should be understood that, although respective steps in the flowcharts of FIG. 13, FIG. 14, FIG. 7, and FIG. 9 are sequentially displayed as indicated by the arrows, these steps are not necessarily performed in the order indicated by the arrows. Unless explicitly stated in this present disclosure, there is no strict order in which these steps may be executed, and these steps may be executed in any other order. Further, at least some of the steps in FIG. 13, FIG. 14, FIG. 7, and FIG. 9 may include multiple sub-steps or multiple stages. These sub-steps or stages are not necessarily performed at the same time, but may be executed at different time points. The execution order of these sub-steps or stages is not necessarily sequential, but may be performed in turn or alternately with at least a portion of other steps or sub-steps or stages of other steps.

FIG. 10 is a block diagram illustrating hardware for implementing a method for processing data in an embodiment. As illustrated in FIG. 10, the electronic device may include a camera module 810, a central processing unit (CPU) 820, and a microcontroller unit (MCU) 830. The camera module 810 includes a laser camera 812, a floodlight 814, a RGB camera 816 and a laser light 818. The MCU 830 includes a pulse width modulation (PWM) module 832, a serial peripheral interface/inter-integrated circuit (SPI/I2C) module 834, a random access memory (RAM) module 836, and a Depth Engine module 838. The central processing unit 820 may be in multiple kernel operation modes. The CPU kernel in the central processing unit 820 may operate under a trusted execution environment (TEE) or under a rich execution environment (REE). Both the TEE and the REE are operation modes of an advanced RISC machines (ARM) module. The rich execution environment 822 in the central processing unit 820 may be the first operation environment with low security. The trusted execution environment 824 in the central processing unit 820 may be the second operation environment with high security. It should be understood that, the microcontroller unit 830 is a processing module independent on the central processing unit 820, and the input and output of the microcontroller unit 830 may be controlled by the central processing unit 820 under the TEE. The microcontroller unit 830 may also be a processing module with high security, and it may also be considered that the microcontroller unit 830 is in a safe operation environment, that is, the microcontroller unit 830 is also in the second operation environment.

In general, an operation behavior with a high security level needs to be executed in the second operation environment, and other operation behavior may be executed in the first operation environment. In embodiments of the present disclosure, the central processing unit 820 may control a SECURE SPI/I2C to send the face recognition instruction to the SPI/I2C module 834 in the microcontroller unit 830 via the trusted execution environment 824. After the microcontroller unit 830 receives the face recognition instruction, when it is determined that the security level of the face recognition instruction is greater than the level threshold, the pulses is emitted via the PWM module 832 to control the floodlight 814 in the camera module 810 to be turned on to collect the infrared image, and to control the laser light 818 in the camera module 810 to be turned on to collect the speckle image. The camera module 810 may transmit the collected infrared image and the collected speckle image to the Depth Engine module 838 in the microcontroller unit 830. The Depth Engine module 838 may calculate the depth image according to the speckle image, and send the infrared image and the depth image to the trusted execution environment 824 of the central processing unit 820. The trusted execution environment 824 of the central processing unit 820 may perform the face recognition processing according to the received infrared image and the depth image.

When it is determined that the security level of the face recognition instruction is lower than the level threshold, the pulses is emitted via the PWM module 832 to control the laser light 818 in the camera module 810 to be turned on to collect the speckle image, and to control the RGB camera 816 to be turned on to collect the visible light image. The camera module 810 may send the collected visible light image to the rich execution environment 822 of the central processing unit 820 directly, and send the speckle image to the Depth Engine module 838 in the microcontroller unit 830. The depth engine module 838 may calculate the depth image according to the speckle image, and send the depth image to the trusted execution environment 824 of the central processing unit 820. Then the depth image is sent from the trusted execution environment 824 to the rich execution environment 822, and the face recognition processing is performed on the visible light image and the depth image in the rich execution environment 822.

FIG. 11 is a block diagram illustrating an apparatus for processing data in an embodiment. As illustrated in FIG. 11, the apparatus 900 for processing data includes: a model obtaining module 902, a model transmitting module 904 and a model storage module 906.

The model obtaining module 902 is configured to obtain a face recognition model stored in a first operation environment.

The model transmitting module 904 is configured to perform the initialization on the face recognition model in the first operation environment, and to perform compression processing on the face recognition model subjected to the initialization.

The model storage module 906 is configured to transmit the face recognition model subjected to the compression processing from the first operation environment to the second operation environment for storing, in which, a storage space in the first operation environment is greater than a storage space in the second operation environment, and the face recognition model is configured to perform face recognition processing on an image. That is, a model total processing module includes the model transmitting module and the model storage module.

With the apparatus for processing data provided in the above embodiment, the face recognition model may be stored in the first operation environment, the initialization is performed on the face recognition model in the first operation environment, the compression processing is performed on the face recognition model subjected to the initialization, and then the face recognition model subjected to the compression processing is transmitted to the second operation environment. Since the storage space in the second operation environment is smaller than the storage space in the first operation environment, the initialization is performed on the face recognition model in the first operation environment, which may improve the efficiency for initializing the face recognition model, reduce a resource occupation rate in the second operation environment, and improve the velocity for processing data. Meanwhile, the face recognition model subjected to the compression processing is transmitted to the second operation environment, which may further improve the velocity for processing data.

Figure 16:
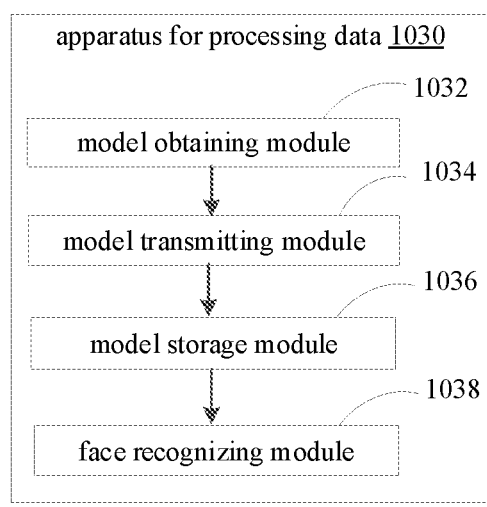
FIG. 16 is a block diagram illustrating an apparatus for processing data in an embodiment of the present disclosure.

FIG. 16 is a block diagram illustrating an apparatus for processing data in an embodiment. As illustrated in FIG. 16, the apparatus 1030 for processing data includes: a model obtaining module 1032, a model transmitting module 1034, a model storage module 1036, and a face recognizing module 1038.

The model obtaining module 1032 is configured to obtain a face recognition model stored in a first operation environment.

The model transmitting module 1034 is configured to perform the initialization on the face recognition model in the first operation environment, and to perform compression processing on the face recognition mode subjected to the initialization.

The model storage module 1036 is configured to transmit the face recognition model subjected to the compression processing from the first operation environment to the second operation environment for storing, in which, a storage space in the first operation environment is greater than a storage space in the second operation environment, and the face recognition model is configured to perform face recognition processing on an image.

The face recognizing module 1038 is configured to determine a security level of a face recognition instruction when the face recognition instruction is detected; to perform the face recognition processing according to the face recognition model in the first operation environment when the security level is lower than a level threshold; and to perform the face recognition processing according to the face recognition model in the second operation environment when the security level is higher than the level threshold, in which, a security level of the second operation environment is higher than a security level of the first operation environment.

With the apparatus for processing data provided in the above embodiment, the face recognition model may be stored in the first operation environment, the initialization is performed on the face recognition model in the first operation environment, the compression processing is performed on the face recognition model subjected to the initialization, and then the face recognition model subjected to the compression processing is transmitted to the second operation environment. Since the storage space in the second operation environment is smaller than the storage space in the first operation environment, the initialization is performed on the face recognition model in the first operation environment, which may improve the efficiency for improving the initialization on the face recognition model, reduce the resource occupancy rate in the second operation environment, and improve the velocity for processing data. In addition, the processing may be performed in the first operation environment or in the second operation environment according to the security level of the face recognition instruction, which may avoid that all the applications are processed in the second operation environment, and reduce the resource occupation rate of the second operation environment.

In an embodiment, the model transmitting module 1034 is further configured to obtain a target space capacity for storing the face recognition model in the second operation environment, and data amount of the face recognition model subjected to the initialization; to calculate a compression coefficient according to the target space capacity and the data amount; and to perform the compression processing on the face recognition model subjected to the initialization according to the compression coefficient.

In an embodiment, the model transmitting module 1034 is further configured to determine a ratio of the target space capacity to the data amount as the compression coefficient when the target space capacity is smaller than the data amount.

In an embodiment, the model storage module 1036 is further configured to transmit the face recognition model subjected to the compression processing from the first operation environment to a share buffer, and to transmit the face recognition model subjected to the compression processing from the share buffer to the second operation environment for storing.

In an embodiment, the model storage module 1036 is further configured to perform encryption processing on the face recognition model subjected to the compression processing, and to transmit the face recognition model subjected to the encryption processing from the first operation environment to the second operation environment; and to perform decryption processing on the face recognition model subjected to the encryption processing in the second operation environment, and to store the face recognition model subjected to the decryption processing.

In an embodiment, the face recognizing module 1038 is configured to control a camera module to collect a first target image and a speckle image, to send the first target image to the first operation environment, and to send the speckle image to the second operation environment; to perform a calculation on the speckle image in the second operation environment to obtain a depth image, and to send the depth image to the first operation environment; and to perform the face recognition processing on the first target image and the depth image by the face recognition model in the first operation environment.

In an embodiment, the face recognizing module 1038 is configured to control the camera module to collect a second target image and the speckle image, and to send the second target image and the speckle image to the second operation environment; to perform a calculation on the speckle image in the second operation environment to obtain the depth image; and to perform the face recognition processing on the second target image and the depth image by the face recognition model in the second operation environment.

The above division of respective modules in the apparatus for processing data is only used for illustration. In other embodiment, the apparatus for processing data may be divided into different modules as needed to perform all or part of the functions of the above apparatus for processing data.

Third Implementation:

FIG. 3 is a block diagram illustrating an internal structure of an electronic device in an embodiment of the present disclosure. As illustrated in FIG. 3, the electronic device 100 includes a processor 110, a memory 120 and a network interface 130 coupled to a system bus 140. The processor 110 is configured to provide computing and controlling ability to support operation of the entire electronic device

100. The memory 120 is configured to store data, programs and the like. The memory 120 has at least one computer program 1224 stored thereon. The computer program 1224 may be configured to implement a method for processing data provided in embodiments of the present disclosure when executed by the processor 110. The memory 120 may include a non-volatile storage medium such as a magnetic disk, an optical disk, a read-only memory (ROM), or a random storage memory (RAM). For example, in an embodiment, the memory 120 includes a non-volatile storage medium 122 and an internal memory 124. The non-volatile storage medium 122 has an operating system 1222 and a computer program 1224 stored thereon. The computer program 1224 is configured to implement a method for processing data provided in embodiments of the present disclosure when executed by the processor 110. The internal memory 124 provides a cached operation environment for the operating system 1222 and the computer program 1224 in the non-volatile storage medium 122. The network interface 130 may be an Ethernet card or a wireless network card or the like for communicating with the external electronic device 100. The electronic device 100 may be a phone, a tablet, a personal assistant, a wearable device or the like.

Figure 17:
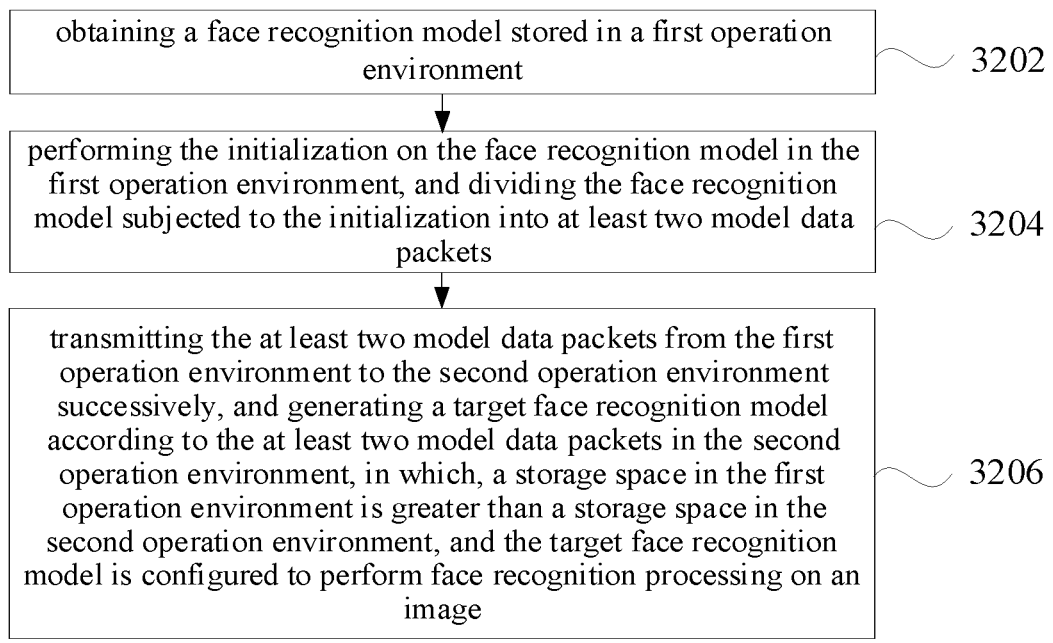
FIG. 17 and FIG. 18 are flow charts illustrating methods for processing data in embodiments of the present disclosure.

FIG. 17 is a flow chart illustrating a method for processing data in an embodiment. The method for processing data includes actions at blocks 3202-3206.

At block 3202, a face recognition model stored in a first operation environment is obtained.

In detail, the electronic device may include a processor. The processor may perform processing such as storing, computing and transmission on data. The processor in the electronic device may operate in different environments. For example, the processor may operate in a TEE (trusted execution environment), or may operate in a REE (rich execution environment). When the processor operates in the TEE, the security of data is higher. When the processor operates in the REE, the security of data is lower.

The electronic device may allocate resources of the processor and divide different resources for different operation environments. For example, in common circumstances, there are fewer processes with higher security requirements in the electronic device, and there are more common processes in the electronic device. Therefore, the electronic device may divide a small part of the resources of the processor into an operation environment with higher security, and divide most of the resources of the processor into an operation environment with lower security.

The face recognition model is an algorithm model for performing face recognition on a face in an image, which is stored generally in form of a file. It may be understood that, since an algorithm for performing the face recognition in the image is complex, a storage space occupied by a stored face recognition model is large. After the electronic device divides the resources of the processor into different operation environments, a divided storage space in the first operation environment is greater than a divided storage space in the second operation environment. Therefore, the electronic device may store the face recognition model in the first operation environment, to ensure that there is enough space in the second operation environment to perform processing on data.

At block 3204, an initialization is performed on the face recognition model in the first operation environment, and the face recognition model subjected to the initialization is divided into at least two model data packets.

It should be noted that, before performing the face recognition processing on the image, there is a need to perform the initialization on the face recognition model. When the face recognition model is stored in the second operation environment, the stored face recognition model needs to occupy the storage space in the second operation environment while performing the initialization on the face recognition model also needs to occupy the storage space in the second operation environment, thus causing excessive resource consumption in the second operation environment, and affecting the efficiency of processing data.

For example, the face recognition model occupies a space of 20 M in the memory, and performing the initialization on the face recognition model needs additional 10 M in the memory. When both storing and the initialization are performed on the face recognition model simultaneously, 30 M in the memory of the second operation environment is needed. However, when the face recognition model is stored in the first operation environment and initialized in the first operation environment, and then the face recognition model subjected to the initialization is sent to the second operation environment, only 10 M in the memory of the second operation environment needs to be occupied, which greatly reduces the resource occupancy rate in the second operation environment.

The electronic device stores the face recognition model in the first operation environment, and the initialization is performed on the face recognition model in the first operation environment, and then the face recognition model subjected to the initialization is transmitted to the second environment, which may reduce occupancy for storage space in the second operation environment. Further, after the initialization is performed on the face recognition model, the initialized face recognition model may be divided into at least two model data packages, such that the initialized face recognition model may be transmitted segmentally.

At block 3206, the at least two model data packets are transmitted from the first operation environment to the second operation environment successively, and a target face recognition model is generated according to the at least two model data packets in the second operation environment, in which, a storage space in the first operation environment is greater than a storage space in the second operation environment, and the target face recognition model is configured to perform face recognition processing on an image. That is, performing the initialization on the face recognition model in the first operation environment and transmitting the face recognition model subjected to the initialization to the second operation environment for storing includes: performing the initialization on the face recognition model in the first operation environment and dividing the face recognition model subjected to the initialization into at least two model data packets; transmitting the at least two model data packets from the first operation environment to the second operation environment successively, and generating a target face recognition model according to the at least two model data packets in the second operation environment, in which, the target face recognition model is configured to perform face recognition processing on an image.

In detail, the face recognition model is stored in form of a file, and after the face recognition model is divided into the at least two model data packets in the first operation environment, the obtained at least two model data packets are transmitted to the second operation environment successively. The at least two model data packets may be spliced together after the at least two model data packets are transmitted to the second operation environment, to generate the target face recognition model. For example, the face recognition model may be divided based on different function modules and transmitted to the second operation environment, and the model data corresponding to respective function modules may be spliced, to generate a final target face recognition model.

In an embodiment, the action at block 3202 may be executed when it is detected that an initialization condition is met. For example, the face recognition model is stored in the first operation environment, and the electronic device may perform the initialization on the face recognition model when turned on, may also perform the initialization on the face recognition model when it is detected that an application needing to perform the face recognition processing is turned on, and may also perform the initialization on the face recognition model when a face recognition instruction is detected, and then the face recognition model subjected to the initialization is compressed and transmitted to the second operation environment.

In other embodiments provided by the present disclosure, before performing the initialization on the face recognition model in the first operation environment, remaining storage space in the second operation environment may be obtained; the initialization is performed on the face recognition model in the first operation environment when the remaining storage space is less than a space threshold, and the face recognition model subjected to the initialization is divided in to the at least two model data packets. The space threshold may be set as needs, which generally is a sum of a storage space occupied by the face recognition model and a storage space occupied by the face recognition model during initialization.

When the remaining storage space in the second operation environment is large, the face recognition model may be sent to the second operation environment directly, and the initialization is performed the face recognition model in the second operation environment, and then the original face recognition model is deleted after the initialization. In this way, security of data may be ensured. The method for processing data described above may also include: when the remaining storage space is greater than or equal to the space threshold, dividing the face recognition model in the first operation environment into the at least two model data packets, transmitting the at least two model data packets to the second operation environment; generating the target face recognition model according to the at least two model data packets in the second operation environment, performing the initialization on the target face recognition model, deleting the target face recognition model before the initialization, and reserving the target face recognition model subjected to the initialization. The face recognition processing may be performed directly on the target face recognition model after the target face recognition model is generated in the second operation environment.

It should be understood that, the face recognition model generally includes a plurality of processing modules. Respective processing modules perform different processing. The plurality of modules may be independent with each other. For example, the plurality of modules may be a face detection module, a face matching module and a living body detection module. A part of processing modules may have lower requirement for security, and a part of processing modules may have higher requirement for security. Therefore, the processing modules with lower security may be initialized in the first operation environment, and the processing modules with higher security may be initialized in the second operation environment.

In detail, the action at block 3204 may include: performing a first initialization on a first model in the face recognition model in the first operation environment, and dividing the face recognition model subjected to the first initialization into the at least two data packets. After the actions at block 3206, the method may include: performing a second initialization on a second model in the target face recognition model. The second model is a module other than the first model in the face recognition model. The security of the first model is lower than the security of the second model. For example, the first model may be a face detection model, and the second model may be a face matching model and a living body detection model. Since the first model has a low requirement for the security, the initialization is performed on the first model in the first operation environment. Since the second model has a higher requirement for the security, the initialization is performed on the second model in the second operation environment.

With the method for processing data provided in the above embodiment, the face recognition model may be stored in the first operation environment, and the face recognition model subjected to the initialization is divided into the at least two model data packets after the initialization is performed on the face recognition model in the first operation environment, and then the at least two model data are transmitted to the second operation environment. Since the storage space in the second operation environment is smaller than the storage space in the first operation environment, performing the initialization on the face recognition model in the first operation environment may improve the efficiency for initializing the face recognition model, reduce a resource occupation rate in the second operation environment, and improve the velocity for processing data. Meanwhile, the face recognition model is divided into a plurality of data packets for transmitting, which may further improve the velocity for processing data.

Figure 18:
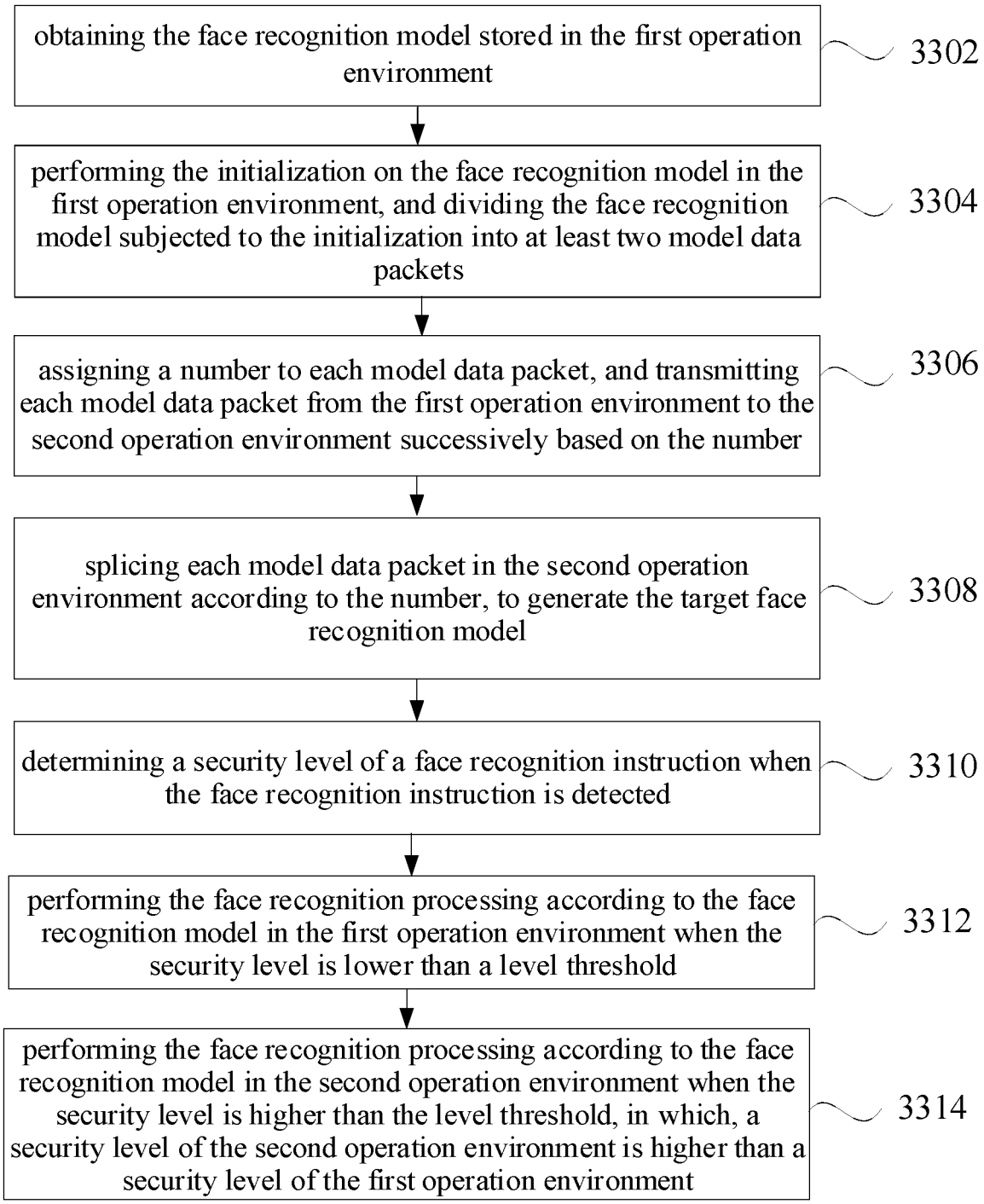

FIG. 18 is a flow chart illustrating a method for processing data in an embodiment. As illustrated in FIG. 18, the method for processing data includes actions at block 3302 to block 3314.

At block 3302, a face recognition model stored in a first operation environment is obtained.

In general, before performing face recognition, training is performed on the face recognition model, such that the face recognition model has higher recognition accuracy. During performing the training on the face recognition model, a training image set may be obtained, an image in the training image set is taken as an input of the face recognition model, and a training parameter of the face recognition model is adjusted constantly according to a training result obtained during training, to obtain an optimum parameter of the face recognition model. The more images are included in the training image set, the more accurate the face recognition model obtained by training will be, but time consumption will increase accordingly.

In an embodiment, the electronic device may be a terminal interacting with a user. However, since resources in the terminal are limited, the training is performed on the face recognition model in the server. The server may send the trained face recognition model to the terminal after performing the training on the face recognition model. The terminal may store the trained face recognition model in the first operation environment after receiving the trained face recognition model. Before the actions at block 3302, the method further includes: receiving, by a terminal, the face recognition model sent by a server, and storing the face recognition model in the first operation environment of the terminal.

The terminal may include the first operation environment and the second operation environment. The terminal may perform the face recognition processing on an image in the second operation environment. However, since the storage space divided into the first operation environment by the terminal is greater than the storage space divided into the second operation environment, the terminal may store the received face recognition model in the storage space of the first operation environment. In an embodiment, when it is detected that the terminal is restarted every time, the face recognition model stored in the first operation environment is loaded to the second operation environment. In this way, the loaded face recognition model in the second operation environment may be invoked directly for processing when there is a need to perform the face recognition processing on the image. The actions at block 3302 may include: obtaining the face recognition model stored in the first operation environment when it is detected that the terminal is restarted.

It should be understood that, the face recognition model may be updated. When the face recognition model is updated, the server may send the updated face recognition model to the terminal. The terminal stores the updated face recognition model in the first operation environment to cover the original face recognition model after receiving the updated face recognition model. Then the terminal is controlled to restart. The updated face recognition model may be obtained after the terminal is restarted, and the initialization is performed on the updated face recognition model.

At block 3304, the initialization is performed on the face recognition model in the first operation environment, a space capacity of the share buffer is obtained, and the face recognition model is divided into at least two model data packets according to the space capacity.

There is a need to perform the initialization on the face recognition model before performing the face recognition processing on the face recognition model. During the initialization, parameters, modules and the like in the face recognition model may be set as a default state. Since performing the initialization on the face recognition model also needs to occupy the memory, the terminal may perform the initialization on the face recognition model in the first operation environment, and then send the face recognition model subjected to the initialization to the second operation environment. In this way, the face recognition processing may be directly performed on the face recognition model in the second operation environment and does not need to occupy additional memory to perform the initialization on the face recognition model.

The face recognition model is stored in form of a file, and may also be stored in other forms, which is not limited herein. The face recognition model may generally include a plurality of function modules, such as, a face detection module, a face matching module, a living body detection module, and the like. When dividing is performed on the face recognition model, the face recognition model may be divided into at least two model data packets based on respective function modules. In this way, it is convenient for subsequent recombination of the at least two model data packets to generate the target face recognition model. In other embodiments, the splicing may be performed based on other ways, which is not limited herein.

At block 3306, a data number is assigned to each model data packet, and each model data packet is transmitted from the first operation environment to the second operation environment successively based on the data number.

It should be understood that, when data is stored, the data will generally be stored in accordance with the time sequence, the data will be written in order to a continuous storage address. After dividing the face recognition model, the model data packets obtained by dividing may be numbered, and each model data packet is transmitted to the second operation environment successively based on the number. After the model data packets are transmitted, the model data packets are spliced to generate the target face recognition model.

In an embodiment, the data transmission between the first operation environment and the second operation environment may be implemented by the share buffer. Therefore, when the face recognition model is divided in the first operation environment, the dividing may be performed based on a space capacity of the share buffer. In detail, the space capacity of the share buffer is obtained, and the face recognition model is divided into at least two model data packets according to the space capacity. Data amount of the model data packets is smaller than the space capacity of the share buffer.

It should be noted that, the share buffer is a channel between the first operation environment and the second operation environment, and both the first operation environment and the second operation environment may access the share buffer. The electronic device may configure the share buffer, and may set a size of the space capacity of the share buffer as needs. For example, the electronic device may set the space capacity of the share buffer to be 5 M, or 10 M. When the data is transmitted, the face recognition model may be divided based on the space capacity of the share buffer, and then transmitted, which does not need to additionally configure a larger amount for the share buffer to transmit the data and reduce resource occupation of the electronic device.

When the face recognition model is transmitted via the share buffer, the method includes: transmitting the at least two model data packets from the first operation environment to the share buffer successively, and transmitting the at least two model data packets from the share buffer to the second operation environment. The actions at block 3306 may include: assigning a data number to each model data packet, transmitting each model data packet from the first operation environment to the share buffer successively based on the data number, and transmitting each model data packet from the share buffer to the second operation environment.

FIG. 5 is a schematic diagram illustrating a system for implementing a method for processing data in an embodiment. As illustrated in FIG. 5, the system includes a first operation environment 302, a share buffer 304 and a second operation environment 306. The first operation environment 302 and the second operation environment 306 may perform data transmission via the share buffer 304. The face recognition model is stored in the first operation environment 302. The system may obtain the face recognition mode stored in the first operation environment 302, perform the initialization on the obtained face recognition model, perform dividing on the face recognition model subjected to the initialization, transmit the model data packets formed by the dividing to the share buffer 304, and then transmit the model data packets to the second operation environment 306 via the share buffer 304. Finally, the model data packets are spliced into a target face recognition model in the second operation environment 306.

At block 3308, each model data packet is spliced in the second operation environment according to the number, to generate the target face recognition model.

Figure 19:
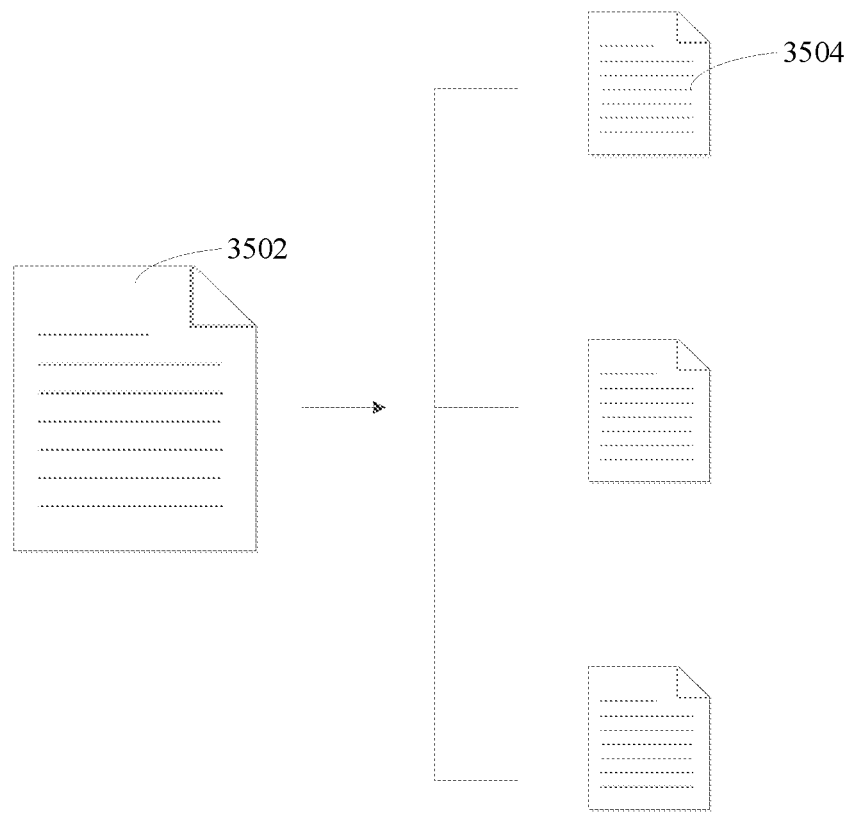
FIG. 19 is a schematic diagram illustrating dividing a face recognition model in an embodiment of the present disclosure.

In detail, the data number may be used to represent an order of the divided model data packets. After the model data packets are transmitted into the second operation environment, the model data packets are arranged in order according to the data number, and then the model data packets are spliced in order to generate the target face recognition model FIG. 19 is a schematic diagram illustrating performing dividing on the face recognition model in an embodiment. As illustrated in FIG. 19, the face recognition model 3502 may be stored in form of a file. The face recognition model 3502 may be divided into three model data packets 3504. The model data packets 3504 may also be stored in form of the file. Data amount of the divided model data packets 3504 is smaller than data amount of the face recognition model 3502. Data amount of each model data packets 3504 may be same, or different. For example, it is assumed that the data amount of the face recognition model 3502 may be 30 M in total, the data amount is divided evenly according to a size of data amount, and then each model data packet is 10 M.

At block 3310, a security level of a face recognition instruction is determined when the face recognition instruction is detected.

Both the first operation environment and the second operation environment have the face recognition model stored thereon. The terminal may perform the face recognition processing in the first operation environment, and may also perform the face recognition processing in the second operation environment. In detail, the terminal may determine that the face recognition processing is performed in the first operation environment or in the second operation environment according to the face recognition instruction for triggering the face recognition processing.

The face recognition instruction is initiated by an upper-level application of the terminal. The upper-level application may write information such as time at which the face recognition instruction is sent, an application marker and an operation marker to the face recognition instruction. The application marker may be used to mark an application that initiates the face recognition instruction. The operation marker may be used to mark an application operation which needs to be performed by a face recognition result. For example, an application operation such as payment, unlocking or face beauty on an image may be performed by the face recognition result, and the operation marker in the face recognition instruction is configured to mark the application operation such as the payment, the unlocking or the face beauty on the image.

The security level is used to represent the security of the application operation. The higher the security level, the higher the security requirement of the application operation is. For example, the payment operation has a high requirement for the security, and the face beauty on the image has a lower requirement for the security, so the security level of the payment operation is higher than the security level of the face beauty on the image. The security level may be written to the face recognition instruction. The terminal may directly read the security level in the face recognition instruction after detecting the face recognition instruction. The terminal may also establish a corresponding relationship of the operation marker in advance, and obtain a corresponding security level by the operation marker in the face recognition instruction after detecting the face recognition instruction.

At block 3312, the face recognition processing is performed according to the face recognition model in the first operation environment when the security level is lower than a level threshold.

When it is detected that the security level is lower than the level threshold, it is considered that the application operation initiating the face recognition processing has a lower requirement for the security, and the face recognition processing may be performed directly according to the face recognition model in the first operation environment. In detail, the face recognition processing may include, but be not limited to, one or more of face detection, face matching and living body detection. The face detection refers to detect whether there is a face in an image. The face matching refers to match the detected face with a preset face. The living body detection refers to detect whether the face in the target image is biologically active.

At block 3314, the face recognition processing is performed according to the face recognition model in the second operation environment when the security level is higher than the level threshold, in which, a security level of the second operation environment is higher than a security level of the first operation environment.

When it is detected that the security level is higher than the level threshold, it is considered that the application operation initiating the face recognition processing has a higher requirement for the security, and the face recognition processing may be performed according to the face recognition model in the second operation environment. In detail, the terminal may send the face recognition instruction to the second operation environment, and control a camera module to collect an image in the second operation environment. The collected image may be sent to the second operation environment firstly, and the security level of the application operation is determined in the second operation environment. When the security level is lower than the level threshold, the collected image is sent to the first operation environment for performing the face recognition processing. When the security level is higher than the level threshold, the face recognition processing is performed on the collected image in the second operation environment.

In detail, as illustrated in FIG. 7, when the face recognition processing is performed in the first operation environment, the method includes actions at following blocks.

At block 502, a camera module is controlled to collect a first target image and a speckle image, the first target image is sent to the first operation environment, and the speckle image is sent to the second operation environment.

An application installed in the terminal may initiate a face recognition instruction, and the face recognition instruction is sent to the second operation environment. When it is detected that the security level of the face recognition instruction is lower than the level threshold, the camera module may be controlled to collect the first target image and the speckle image. The first target image collected by the camera module may be sent to the first operation environment directly, and the collected speckle image may be sent to the second operation environment.

In an embodiment, the first target image may be a visible light image, or other types of images, which is not limited herein. When the first target image is the visible light image, the camera module may include a red green blue (RGB) camera, and the first target image may be collected via the RGB camera. The camera module may also include a laser light and a laser camera. The terminal may control the laser light to be turned on, and then collect a speckle image formed by laser speckle emitted by the laser light collected by the laser camera.

In detail, when a laser illuminates on optical roughness surfaces with an average fluctuation greater than a wavelength of an order of magnitude, wavelets scattered by randomly distributed face elements on these surfaces overlap each other, such that a reflected light field has a random spatial intensity distribution, and a structure with a granular structure is presented, which is a laser speckle. The formed laser speckle has a high randomness. Therefore, lasers emitted by different laser transmitters generate different laser speckles. When the formed laser speckle are emitted to objects with different depths and shapes, the generated speckle images are different. The laser speckles formed by the different laser lights are unique, such that the obtained speckle images are also unique.

At block 504, a calculation is performed on the speckle image in the second operation environment to obtain a depth image, and the depth image is sent to the first operation environment.

In order to protect the security of the data, the terminal may ensure that the speckle image is always processed in a safe environment. Therefore, the terminal will transmit the speckle image to the second operation environment for processing. The depth image is used to represent depth information of a captured object, and may be obtained according to the speckle image. The terminal may control the camera module to collect the first target image and the speckle image simultaneously. The depth image obtained according to the speckle image may represent the depth information of the object in the first target image.

The depth image may be obtained according to the speckle image and a reference image in the second operation environment. The depth image is collected when the laser speckle is illuminated to the reference plane. Therefore, the reference image has reference depth information thereon. Firstly, an opposing depth is calculated according to offsets of positions of speckle points in the speckle image relative to positions of the speckle points in the reference image. The opposing depth may represent depth information between an actual captured object and the reference plane. Then, actual depth information of the object may be calculated according to the obtained opposing depth and the reference depth. In detail, the reference image is compared with the speckle image to obtain offset information. The offset information is used to represent horizontal offset of the speckle points in the speckle image relative to the corresponding speckle points in the reference image. The depth image is obtained according to the offset information and the reference depth information.

FIG. 8 is a schematic diagram illustrating calculation of depth information in an embodiment. As illustrated in FIG. 8, the laser light 602 may generate a laser speckle. A formed image may be obtained via the laser camera 604 after the laser speckle is reflected by an object. During calibration of a camera, the laser speckle emitted by the laser light 602 may be reflected by a reference plane 608, and a reflected light ray is collected via a laser camera 604, and then a reference image is obtained by an imaging plane 610 imaging. A reference depth between the reference plane 608 and the laser light 602 is L, which is a known value. In an actual procedure for calculating depth information, the laser speckle emitted by laser light 602 may be reflected via the object 606, and the reflected light ray is collected by the laser camera 604, and then an actual speckle image is obtained by the imaging plane 610 imaging. Therefore, the calculation algorithm (1) of the actual depth information may be obtained as follows.

$$Dis = \frac{CD \times L \times f}{L \times AB + CD \times f},\quad (1)$$

where L is the distance between the laser light 602 and the reference plane 608, f is a focal of a lens in the laser camera 604, CD is a distance between the laser light 602 and the laser camera 604, AB is an offset distance between an imaging of the object 606 and an imaging of the reference plane 608. AB may be a product of offset n of a pixel and an actual distance p of the pixel. When Dis between the object 606 and the laser light 602 is greater than distance L between the reference plane 608 and the laser light 602, AB is a negative value. When Dis between the object 606 and the laser light 602 is smaller than the distance L between the reference plane 608 and the laser light 602, AB is a positive value.

At block 506, the face recognition processing is performed on the first target image and the depth image by the face recognition model in the first operation environment.

After the depth image is obtained in the second operation environment, the obtained depth image may be sent to the first operation environment, and then the face recognition processing is performed on the first target image and the depth image in the first operation environment. Then a face recognition result in the first operation environment is sent to an upper-level application. The upper-level application may perform corresponding application operation according to the face recognition result.

For example, when face beauty processing is performed on an image, position and area where a face is located may be detected by the first target image. Since the first target image corresponds to the depth image, depth information of the face may be obtained by an area corresponding to the depth image, and a face three dimensional feature may be built by the depth information of the face, thus performing the face beauty processing on the face according to the face three dimensional feature.

In other embodiments provided by the present disclosure, as illustrated in FIG. 9, performing the face recognition processing in the second operation environment includes actions at following blocks.

At block 702, a camera module is controlled to collect a second target image and a speckle image, and the second target image and the speckle image are sent to the second operation environment.

In an embodiment, the second target image may be an infrared image. The camera module may include a floodlight, a laser light, and a laser camera. The terminal may control the floodlight to be turned on, and then collet an infrared image formed by the floodlight illuminating an object via the laser camera as the second target image. The terminal may also control the laser light to be turned on, and then collect a speckle image formed by the laser light illuminating the object via the laser camera.

A time internal between a time point at which the second target image is collected and a time point at which the speckle image is collected is relatively short, which may ensure consistency of the collected second target image and the collected speckle image, avoid that there are large errors between the second target image and the speckle image, and improve accuracy for processing the image. In detail, the camera module is controlled to collect the second target image, and the camera module is controlled to collect the speckle image. The time internal between a first time point at which the second target image is collected and a second time point at which the speckle image is collected is lower than a first threshold.

A floodlight controller and a laser light controller may be provided respectively. The floodlight controller and the laser light controller may be coupled to two pulse width modulations (PWM). When there is a need to control the floodlight or the laser light to be turned on, pulses may be sent to the floodlight controller to control the floodlight to be turned on or may be sent to the laser light controller to control the laser light to be turned via the PWM, and the time internal between the time point at which the second target image is collected and the time point at which the speckle image is collected may be controlled by the PWMs respectively sending the pulses to the two controllers. It should be understood that, the second target image may be an infrared image, or other types of images, which is not limited herein. For example, the second target image may also be a visible light image.

At block 704, a calculation is performed on the speckle image in the second operation environment to obtain a depth image.

It should be noted that, when the security level of the face recognition instruction is higher than the level threshold, it is considered that an application operation initiating the face recognition instruction has a high requirement for the security level. Therefore, there is a need to perform the face recognition processing in an environment with a high security, which may ensure the security for processing data. The second target image and the speckle image collected by camera module may be sent to the second operation environment directly, and then the calculation is performed on the speckle image in the second operation environment to obtain the depth image.

At block 706, the face recognition processing is performed on the second target image and the depth image by the face recognition model in the second operation environment.

In an embodiment, when the face recognition processing is performed in the second operation environment, the face detection may be performed on the second target image, to detect whether there is a target face in the second target image. When there is the target face in the second target image, the detected target face is matched with the preset face. When the detected target face is matched with the present face, target depth information of the target face may be obtained according to the depth image, and it is detected whether the target face is biologically active according to the target depth information.

When the matching is performed on the target face, a face attribute feature of the target face may be extracted, and the extracted face attribute feature is matched with a face attribute feature of the preset face. When a matching value exceeds a matching threshold, it is considered that the face is matched successfully. For example, features such as a deflection angle, brightness information, and facial features of the face may be extracted as the face attribute features. When a matching degree between the face attribute feature of the target face and the face attribute feature of the preset face exceeds 90%, the matching of the face is considered successful.

In general, during face verification, it is assumed that a face in a photo or a face of a sculpture is captured, the extracted face attribute feature may also be verified successfully. In order to improve the accuracy, the living detection processing may be performed on the collected depth image. In this way, it is ensured that the verification is successful only when the collected face is a biologically active face. It may be understood that, the collected second target image may represent detailed information of the face, the collected depth image may represent corresponding depth information, and the living detection may be performed according to the depth image. For example, when the captured face is the face in the photo, it is determined that the collected face is not tridimensional according to the depth image, and it may be considered that the collected face is not the biologically active face.

In detail, performing the living detection on the depth image includes: searching for face depth information corresponding to the target face in the depth image, and determining the target face to be the biologically active face when there is the face depth information corresponding to the target face in the above depth image and the face depth information conforms to a face tridimensional rule. The above face tridimensional rule is a rule with face three-dimensional depth information.

In an embodiment, artificial intelligent recognition may also be performed on the second target face and the depth image by employing an artificial intelligent model, to obtain a living body attribute feature corresponding to the target face, and it is determined whether the target face is the biologically active face according to the obtained living body attribute feature. The living body attribute feature may include a skin texture feature, a direction of the texture, a density of the texture, a width of the texture, and the like corresponding to the target face. When the living body attribute feature conforms to a face living rule, it is considered that the target face is biologically active, i.e., a biologically active face.

It should be understood that, when some processing such as face detection, face matching, living body detection and the like are performed, the processing order may be adjusted as needs. For example, the verification may be performed on the face firstly, and then it is detected whether the face is biologically active. It may also be detected whether the face is biologically active firstly, and then the verification is performed on the face.

In embodiments provided by the present disclosure, in order to ensure the security of data, when the face recognition model is transmitted, the encryption processing may be performed on the face recognition model subjected to the compression processing, and the face recognition model subjected to the encryption processing is transmitted from the first operation environment to the second operation environment; decryption processing is performed on the face recognition model subjected to the encryption processing in the second operation environment, and the face recognition model subjected to the decryption processing is stored.

The first operation environment may be a common operation environment, the second operation environment may be a safe operation environment, and the security of the second operation environment is higher than the security of the first operation environment. The first operation environment is generally configured to perform processing on application operations with lower security requirement, and the second operation environment is generally configured to perform processing on application operations with higher security requirement. For example, operations with lower security requirement such as photographing and games may be performed in the first operation environment, and operations with higher security requirement such as payment and unlocking may be performed in the second operation environment.

The second operation environment is generally configured to perform application operations with high security requirement. Therefore, when the face recognition model is sent to the second operation environment, there is a need to ensure the security of the face recognition model. After the compression is performed on the face recognition model in the first operation environment, the encryption processing may be performed on the face recognition model subjected to the compression, and then the face recognition model subjected to the encryption processing is sent from the share buffer to the second operation environment.

The face recognition model subjected to the encryption processing is transmitted from the share buffer to the second operation environment after being transmitted from the first operation environment to the share buffer. The second operation environment performs decryption processing on the received face recognition model subjected to the encryption processing. Algorithms for performing the encryption processing on the face recognition model are not limited in this embodiment. For example, the encryption processing may be performed according to the encryption algorithm such as data encryption standard (DES), message-digest algorithm 5 (MD5), diffie-hellman (HAVAL) and the like.

In an embodiment, after generating the target face recognition model in the second operation environment, the method may also include: when it is detected that a time period when the target face recognition model is not invoked exceeds a time threshold, or it is detected that the terminal is turned off, the target face recognition model in the second operation environment is deleted. In this way, the storage space of the second operation environment may be released, to save the space of the electronic device.

Further, the operating condition of the electronic device may be detected when the electronic device is operating, and the storage space occupied by the target face recognition model may be released according to the operating condition of the electronic device. In detail, when it is detected that the electronic device is in a stuck state, and the time period when the target face recognition model is not invoked exceeds the time threshold, the target face recognition model in the second operation environment is deleted.

After the storage space occupied by the target face recognition model is released, when it is detected that the electronic device returns to a normal operation, or a face recognition instruction is detected, the face recognition model stored in the first operation environment may be obtained; the initialization is performed on the face recognition model in the first operation environment, and the face recognition model subjected to the initialization is divided into at least two model data packets; and the at least two model data packets is transmitted from the first operation environment to the second operation environment successively, and the target face recognition model is generated according to the at least two model data packets in the second operation environment.

With the method for processing data provided in the above embodiment, the face recognition model may be stored in the first operation environment, the initialization is performed on the face recognition model in the first operation environment, the face recognition model subjected to the initialization is divided into at least two model data packets; and then the at least two model data packets are transmitted to the second operation environment. Since the storage space of the second operation environment is smaller than the storage space of the first operation environment, the initialization is performed on the face recognition model in the first operation environment, which may improve the efficiency for improving the initialization on the face recognition model, reduce the resource occupancy rate in the second operation environment, and improve the velocity for processing data. Meanwhile, the face recognition model is divided into a plurality of data packets, which improves efficiency for transmitting the data. In addition, the processing may be performed in the first operation environment or in the second operation environment according to the security level of the face recognition instruction, which may avoid that all the applications are processed in the second operation environment, and reduce the resource occupation rate of the second operation environment.

It should be understood that, although respective steps in the flowcharts of FIG. 17, FIG. 18, FIG. 7, and FIG. 9 are sequentially displayed as indicated by the arrows, these steps are not necessarily performed in the order indicated by the arrows. Unless explicitly stated in this present disclosure, there is no strict order in which these steps may be executed, and these steps may be executed in any other order. Further, at least some of the steps in FIG. 17, FIG. 18, FIG. 7, and FIG. 9 may include multiple sub-steps or multiple stages. These sub-steps or stages are not necessarily performed at the same time, but may be executed at different time points. The execution order of these sub-steps or stages is not necessarily sequential, but may be performed in turn or alternately with at least a portion of other steps or sub-steps or stages of other steps.

FIG. 10 is a block diagram illustrating hardware for implementing a method for processing data in an embodiment. As illustrated in FIG. 10, the electronic device may include a camera module 810, a central processing unit (CPU) 820, and a microcontroller unit (MCU) 830. The camera module 810 includes a laser camera 812, a floodlight 814, a RGB camera 816 and a laser light 818. The MCU 830 includes a pulse width modulation (PWM) module 832, a serial peripheral interface/inter-integrated circuit (SPI/I2C) module 834, a random access memory (RAM) module 836, and a depth engine module 838. The central processing unit 820 may be in multiple kernel operation modes. The CPU kernel in the central processing unit 820 may operate under a trusted execution environment (TEE) or under a rich execution environment (REE). Both the TEE and the REE are operation modes of an advanced RISC machines (ARM) module. The rich execution environment 822 in the central processing unit 820 may be the first operation environment with low security. The trusted execution environment 824 in the central processing unit 820 may be the second operation environment with high security. It should be understood that, the microcontroller unit 830 is a processing module independent on the central processing unit 820, and the input and output of the microcontroller unit 830 may be controlled by the central processing unit 820 under the TEE. The microcontroller unit 830 may also be a processing module with high security, and it may also be considered that the microcontroller unit 830 is in a safe operation environment, that is, the microcontroller unit 830 is also in the second operation environment.

In general, an operation behavior with a high security level needs to be executed in the second operation environment, and other operation behavior may be executed in the first operation environment. In embodiments of the present disclosure, the central processing unit 820 may control a SECURE SPI/I2C to send the face recognition instruction to the SPI/I2C module 834 in the microcontroller unit 830 via the trusted execution environment 824. After the microcontroller unit 830 receives the face recognition instruction, when it is determined that the security level of the face recognition instruction is greater than the level threshold, the pulses is emitted via the PWM module 832 to control the floodlight 814 in the camera module 810 to be turned on to collect the infrared image, and to control the laser light 818 in the camera module 810 to be turned on to collect the speckle image. The camera module 810 may transmit the collected infrared image and the collected speckle image to the depth engine module 838 in the microcontroller unit 830. The depth engine 838 may calculate the depth image according to the speckle image, and send the infrared image and the depth image to the trusted execution environment 824 of the central processing unit 820. The trusted execution environment 824 of the central processing unit 820 may perform the face recognition processing according to the received infrared image and the depth image.

When it is determined that the security level of the face recognition instruction is lower than the level threshold, the pulses is emitted via the PWM module 832 to control the laser light 818 in the camera module 810 to be turned on to collect the speckle image, and to control the RGB camera 816 to be turned on to collect the visible light image. The camera module 810 may send the collected visible light image to the rich execution environment 822 of the central processing unit 820 directly, and send the speckle image to the depth engine module 838 in the microcontroller unit 830. The depth engine module 838 may calculate the depth image according to the speckle image, and send the depth image to the trusted execution environment 824 of the central processing unit 820. Then the depth image is sent from the trusted execution environment 824 to the rich execution environment 822, and the face recognition processing is performed on the visible light image and the depth image in the rich execution environment 822.

Figure 20:
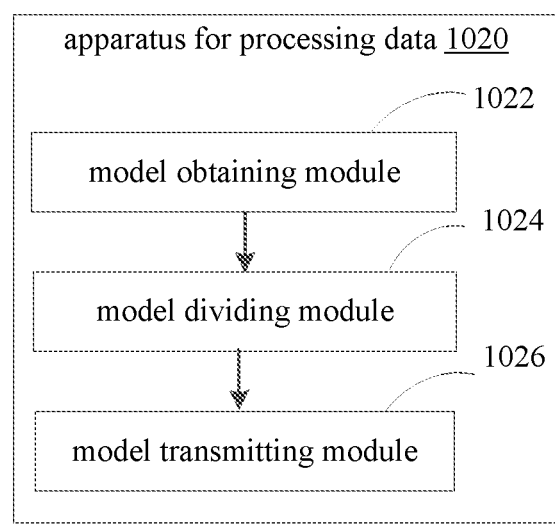
FIG. 20 and FIG. 21 are block diagrams illustrating apparatuses for processing data in embodiments of the present disclosure.

FIG. 20 is a block diagram illustrating an apparatus for processing data in an embodiment. As illustrated in FIG. 20, the apparatus 1020 for processing data includes: a model obtaining module 1022, a model splicing module 1024 and a model transmitting module 1026.

The model obtaining module 1022 is configured to obtain a face recognition model stored in a first operation environment.

The model splicing module 1024 is configured to perform initialization on the face recognition model in the first operation environment, and to divide the face recognition model subjected to the initialization into at least two model data packets.

The model transmitting module 1026 is configured to transmit the at least two model data packets from the first operation environment to the second operation environment successively, and to generate a target face recognition model according to the at least two model data packets in the second operation environment, in which, a storage space in the first operation environment is greater than a storage space in the second operation environment, and the target face recognition model is configured to perform face recognition processing on the image. That is, a model total processing module includes the model splicing module and the model transmitting module.

With the apparatus for processing data provided by the above embodiment, the face recognition model may be stored in the first operation environment, and the face recognition model subjected to the initialization is divided into the at least two model data packets after the initialization is performed on the face recognition model in the first operation environment, and then the at least two model data are transmitted to the second operation environment. Since the storage space in the second operation environment is smaller than the storage space in the first operation environment, performing the initialization on the face recognition model in the first operation environment may improve the efficiency for initializing the face recognition model, reduce a resource occupation rate in the second operation environment, and improve the velocity for processing data. Meanwhile, the face recognition model is divided into a plurality of data packets for transmitting, which may further improve the velocity for processing data.

Figure 21:
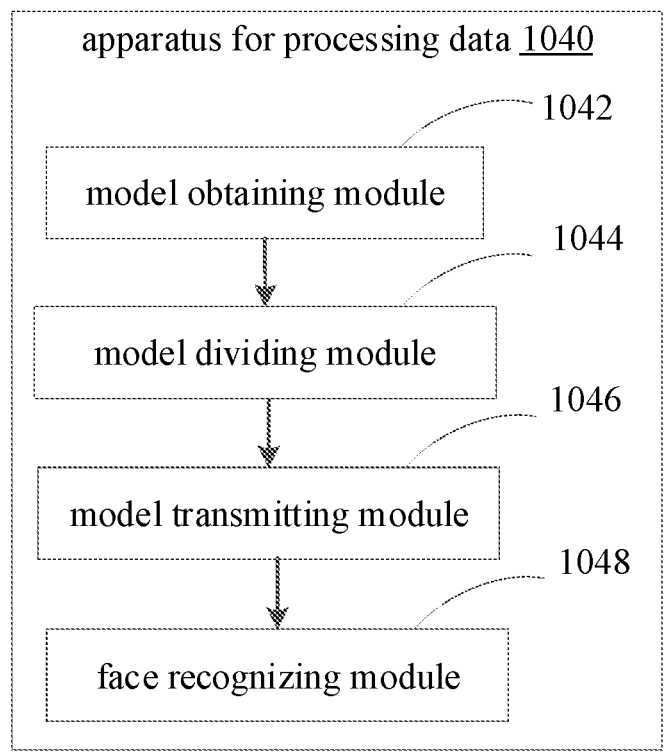

FIG. 21 is a block diagram illustrating an apparatus for processing data in an embodiment. As illustrated in FIG. 21, the apparatus 1040 for processing data includes: a model obtaining module 1042, a model dividing module 1044, a model transmitting module 1046, and a face recognizing module 1048.

The model obtaining module 1042 is configured to obtain a face recognition model stored in a first operation environment.

The model dividing module 1044 is configured to perform initialization on the face recognition model in the first operation environment, and to divide the face recognition model subjected to the initialization into at least two model data packets.

The model transmitting module 1046 is configured to transmit the at least two model data packets from the first operation environment to the second operation environment successively, and to generate a target face recognition model according to the at least two model data packets in the second operation environment, in which, a storage space in the first operation environment is greater than a storage space in the second operation environment, and the target face recognition model is configured to perform face recognition processing on the image.

The face recognizing module 1048 is configured to determine a security level of a face recognition instruction when the face recognition instruction is detected; to perform the face recognition processing according to the face recognition model in the first operation environment when the security level is lower than a level threshold; and to perform the face recognition processing according to the face recognition model in the second operation environment when the security level is higher than the level threshold, in which, a security level of the second operation environment is higher than a security level of the first operation environment.

With the method for processing data provided in the above embodiment, the face recognition model may be stored in the first operation environment, the initialization is performed on the face recognition model in the first operation environment, the face recognition model subjected to the initialization is divided into the at least two model data packets; and then the at least two model data packets are transmitted to the second operation environment. Since the storage space of the second operation environment is smaller than the storage space of the first operation environment, the initialization is performed on the face recognition model in the first operation environment, which may improve the efficiency for improving the initialization on the face recognition model, reduce the resource occupancy rate in the second operation environment, and improve the velocity for processing data. Meanwhile, the face recognition model is divided into a plurality of data packets, which improves efficiency for transmitting the data. In addition, the processing may be performed in the first operation environment or in the second operation environment according to the security level of the face recognition instruction, which may avoid that all the applications are processed in the second operation environment, and reduce the resource occupation rate of the second operation environment.

In an embodiment, the model dividing module 1044 is further configured to obtain space capacity of the share buffer, and to divide the face recognition model into at least two model data packets according to the space capacity, in which, data amount of the at least two model data packets is smaller than or equal to the space capacity.

In an embodiment, the model transmitting module 1046 is further configured to transmit the at least two model data packets from the first operation environment to a share buffer successively, and to transmit the least two model data packets from the share buffer to the second operation environment.

In an embodiment, the model transmitting module 1046 is further configured to assign a number to each model data packet, and to transmit each model data packet from the first operation environment to the second operation environment successively based on the number; and to splice each model data packet in the second operation environment according to the number, to generate the target face recognition model.

In an embodiment, the model transmitting module 1046 is further configured to perform encryption processing on the at least two model data packets, and to transmit the at least two model data packets subjected to the encryption processing from the first operation environment to the second operation environment; and to perform decryption processing on the at least two model data packets subjected to the encryption processing in the second operation environment.

In an embodiment, the face recognizing module 1048 is further configured to control a camera module to collect a first target image and a speckle image, to send the first target image to the first operation environment, and to send the speckle image to the second operation environment; to perform a calculation on the speckle image in the second operation environment to obtain a depth image, and to send the depth image to the first operation environment; and to perform face recognition processing on the first target image and the depth image by the face recognition model in the first operation environment In an embodiment, the face recognizing module 1048 is further configured to control the camera module to collect a second target image and the speckle image, and to send the second target image and the speckle image to the second operation environment; to perform a calculation on the speckle image in the second operation environment to obtain the depth image; and to perform the face recognition processing on the second target image and the depth image by the face recognition model in the second operation environment.

The above division of respective modules in the apparatus for processing data is only used for illustration. In other embodiment, the apparatus for processing data may be divided into different modules as needed to perform all or part of the functions of the above apparatus for processing data.

Embodiments of the present disclosure further provide a computer readable storage medium. One or more non-volatile computer readable storage mediums including computer executable instruction enable one or more processors to execute the method for processing data provided by the above first implementation, second implementation and third implementation when the computer executable instruction is executed by the one or more processors.

Embodiments of the present disclosure further provide a computer program product including instructions. When the instructions are configured to operate in the computer, the method for processing data provided by the above first implementation, second implementation and third implementation are executed by the computer.

Figure 22:
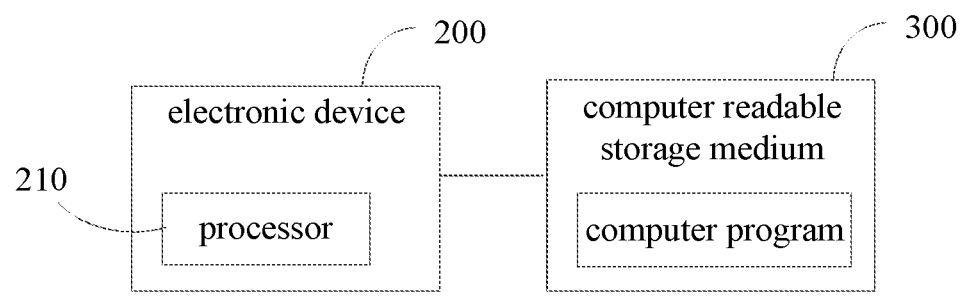
FIG. 22 is a schematic diagram illustrating a connection state between an electronic device and a computer readable storage medium in an embodiment of the present disclosure.

Please refer to FIG. 22, embodiments of the present disclosure provide a computer readable storage medium 300 having a computer program stored thereon. When the computer program is executed by the processor 210, the method for processing data provided by the above first implementation, second implementation and third implementation is implemented.

Figure 23:
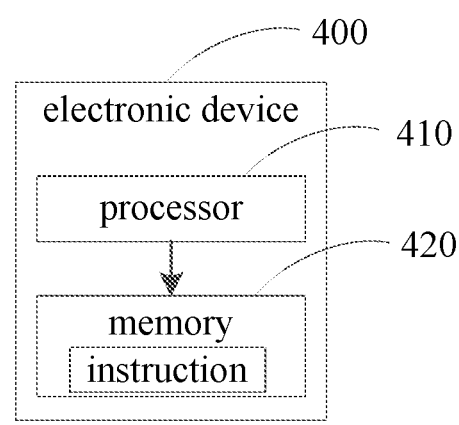
FIG. 23 is a block diagram illustrating an electronic device in an embodiment of the present disclosure.

Please refer to FIG. 23, embodiments of the present disclosure further provide an electronic device 400. The electronic device 400 includes a memory 420 and a processor 410. The memory 420 has computer readable instructions stored thereon. When the instructions are executed by the processor 410, the processor 410 is caused to execute the method for processing data provided by the above first implementation, second implementation and third implementation is implemented.

Any reference to a memory, a storage medium, a database or other medium as used herein may include non-volatile and/or volatile memory. A suitable non-volatile memory can include a ROM, a programmable read-only memory (PROM), an erasable programmable read-only memory (EPROM), an electrically erasable programmable read-only memory (EEPROM), or a flash memory. The volatile memory can include a random access memory (RAM) which may act as an external cache memory. By way of illustration and not limitation, the RAM is available in many forms such as a static RAM (SRAM), a dynamic RAM (DRAM), a synchronous DRAM (S DRAM), a dual data rate SDRAM (DDRSDRAM), an enhanced SDRAM (ES-DRAM), a synchlink DRAM (SLDRAM), a direct rambus RAM (DRRAM), a direct rambus dynamic RAM (DRDRAM) and a rambus dynamic RAM (RDRAM).

The above embodiments only express several implementations of the present application, and their description is relatively specific and detailed, but it cannot be interpreted as the limitation to the scope of the present application. It should be pointed out that for ordinary technical personnel in this field, certain deformation and improvement can be made under the premise of not deviating from the concept of the present application, which all belong to the protection scope of the present application. Therefore, the protection scope of the present application shall be subject to the attached claims.

What is claimed is:

1. A method for processing data, comprising:
   obtaining a face recognition model stored in a first operation environment; and
   performing an initialization on the face recognition model in the first operation environment, and transmitting the face recognition model subjected to the initialization to a second operation environment for storing, comprising:
   performing a first initialization on a first module having a first security level in the face recognition model in the first operation environment; and
   performing a second initialization on a second model having a second security level in the face recognition model subjected to the first initialization in the second operation environment after transmitting the face recognition model subjected to the first initialization to the second operation environment,
   wherein a storage space in the first operation environment is greater than a storage space in the second operation environment, and wherein a security level of the first operation environment is lower than a security level in the second operation environment, and wherein the first security level is lower than the second security level.

2. The method of claim 1, wherein, performing the initialization on the face recognition model in the first operation environment and transmitting the face recognition model subjected to the initialization to the second operation environment for storing comprise:
  performing the initialization on the face recognition model in the first operation environment, and transmitting the face recognition model subjected to the initialization to a share buffer; and
  transmitting the face recognition model subjected to the initialization from the share buffer to the second operation environment for storing, in which, the face recognition model is configured to perform face recognition processing on an image.

3. The method of claim 2, further comprising:
  receiving, by a terminal, the face recognition model sent by a server, storing the face recognition model in the first operation environment of the terminal, wherein,
  obtaining the face recognition model stored in the first operation environment comprises:
    obtaining the face recognition model stored in the first operation environment when it is detected that the terminal is restarted.

4. The method of claim 2, wherein, transmitting the face recognition model subjected to the initialization to the share buffer comprises:
  performing encryption processing on the face recognition model subjected to the initialization, and transmitting the face recognition model subjected to the encryption processing to the share buffer; and
  transmitting the face recognition model subjected to the initialization from the share buffer to the second operation environment for storing comprises:
    transmitting the face recognition model subjected to the encryption processing from the share buffer to the second operation environment for storing, and performing decryption processing on the face recognition model subjected to the encryption processing in the second operation environment.

5. The method of claim 2, wherein, performing the initialization on the face recognition model in the first operation environment, and transmitting the face recognition model subjected to the initialization to the share buffer comprise:
  obtaining remaining storage space in the second operation environment; and
  performing the initialization on the face recognition model in the first operation environment when the remaining storage space is less than a space threshold, and transmitting the face recognition model subjected to the initialization to the share buffer; and
  the method further comprises:
  transmitting the face recognition model to the share buffer when the remaining storage space exceeds or equals to the space threshold, and transmitting the face recognition model from the share buffer to the second operation environment; and
  performing the initialization on the face recognition model in the second operation environment, deleting the face recognition model before the initialization, and reserving the face recognition model after the initialization.

6. The method of claim 2, further comprising:
  determining a security level of a face recognition instruction when the face recognition instruction is detected;
  performing the face recognition processing according to the face recognition model in the first operation environment when the security level is lower than a level threshold; and
  performing the face recognition processing according to the face recognition model in the second operation environment when the security level is higher than the level threshold.

7. The method of claim 6, wherein, performing the face recognition processing according to the face recognition model in the first operation environment comprises:
  controlling a camera module to collect a first target image and a speckle image, sending the first target image to the first operation environment, and sending the speckle image to the second operation environment;
  performing a calculation on the speckle image in the second operation environment to obtain a depth image, and sending the depth image to the first operation environment; and
  performing the face recognition processing on the first target image and the depth image by the face recognition model in the first operation environment.

8. The method of claim 6, wherein, performing the face recognition processing according to the face recognition model in the second operation environment comprises:
  controlling a camera module to collect a second target image and a speckle image, and sending the second target image and the speckle image to the second operation environment;
  performing a calculation on the speckle image in the second operation environment to obtain a depth image; and
  performing the face recognition processing on the second target image and the depth image by the face recognition model in the second operation environment.

9. The method of claim 1, wherein, performing the initialization on the face recognition model in the first operation environment and transmitting the face recognition model subjected to the initialization to the second operation environment for storing comprise:
  performing the initialization on the face recognition model in the first operation environment, and performing compression processing on the face recognition model subjected to the initialization; and
  transmitting the face recognition model subjected to the compression processing from the first operation environment to the second operation environment for storing, wherein, the face recognition model is configured to perform face recognition processing on an image.

10. The method of claim 9, wherein, performing the compression processing on the face recognition model subjected to the initialization comprises:
  obtaining a target space capacity for storing the face recognition model in the second operation environment, and data amount of the face recognition model subjected to the initialization;
  calculating a compression coefficient according to the target space capacity and the data amount by determining a ratio of the target space capacity to the data amount as the compression coefficient when the target space capacity is smaller than the data amount; and
  performing the compression processing on the face recognition model subjected to the initialization according to the compression coefficient.

11. The method of claim 9, wherein, transmitting the face recognition model subjected to the compression processing from the first operation environment to the second operation environment for storing comprises:
  transmitting the face recognition model subjected to the compression processing from the first operation environment to a share buffer, and transmitting the face recognition model subjected to the compression processing from the share buffer to the second operation environment for storing.

12. The method of claim 9, wherein, transmitting the face recognition model subjected to the compression processing from the first operation environment to the second operation environment for storing comprises:
performing encryption processing on the face recognition model subjected to the compression processing, and transmitting the face recognition model subjected to the encryption processing from the first operation environment to the second operation environment; and
performing decryption processing on the face recognition model subjected to the encryption processing in the second operation environment, and storing the face recognition model subjected to the decryption processing.

13. The method of claim 9, further comprising:
determining a security level of a face recognition instruction when the face recognition instruction is detected;
performing the face recognition processing according to the face recognition model in the first operation environment when the security level is lower than a level threshold; and
performing the face recognition processing according to the face recognition model in the second operation environment when the security level is higher than the level threshold.

14. The method of claim 13, wherein, performing the face recognition processing according to the face recognition model in the first operation environment comprises:
controlling a camera module to collect a first target image and a speckle image, sending the first target image to the first operation environment, and sending the speckle image to the second operation environment;
performing a calculation on the speckle image in the second operation environment to obtain a depth image, and sending the depth image to the first operation environment; and
performing the face recognition processing on the first target image and the depth image by the face recognition model in the first operation environment; and
performing the face recognition processing according to the face recognition model in the second operation environment comprises:
controlling the camera module to collect a second target image and the speckle image, and sending the second target image and the speckle image to the second operation environment;
performing a calculation on the speckle image in the second operation environment to obtain the depth image; and
performing the face recognition processing on the second target image and the depth image by the face recognition model in the second operation environment.

15. The method of claim 1, wherein, performing the initialization on the face recognition model in the first operation environment and transmitting the face recognition model subjected to the initialization to the second operation environment for storing comprise:
performing the initialization on the face recognition model in the first operation environment, and dividing the face recognition model subjected to the initialization into at least two model data packets; and
transmitting the at least two model data packets from the first operation environment to the second operation environment successively, and generating a target face recognition model according to the at least two model data packets in the second operation environment, wherein, the target face recognition model is configured to perform face recognition processing on an image.

16. The method of claim 15, wherein, transmitting the at least two model data packets from the first operation environment to the second operation environment successively comprises:
transmitting the at least two model data packets from the first operation environment to a share buffer successively, and transmitting the at least two model data packets from the share buffer to the second operation environment.

17. The method of claim 16, wherein, dividing the face recognition model subjected to the initialization into the at least two model data packets comprises:
obtaining space capacity of the share buffer, and dividing the face recognition model into at least two model data packets according to the space capacity, in which, data amount of the at least two model data packets is smaller than or equal to the space capacity.

18. The method of claim 15, wherein, transmitting the at least two model data packets from the first operation environment to the second operation environment successively and generating the target face recognition model according to the at least two model data packets in the second operation environment comprise:
assigning a number to each model data packet, and transmitting each model data packet from the first operation environment to the second operation environment successively based on the number; and
splicing each model data packet in the second operation environment according to the number, to generate the target face recognition model.

19. An apparatus for processing data, comprising:
one or more processors,
a memory storing instructions executable by the one or more processors,
wherein the one or more processors are configured to:
obtain a face recognition model stored in a first operation environment; and
perform an initialization on the face recognition model in the first operation environment, and transmit the face recognition model subjected to the initialization to a second operation environment for storing, comprising:
perform a first initialization on a first module having a first security level in the face recognition model in the first operation environment; and
perform a second initialization on a second model having a second security level in the face recognition model subjected to the first initialization in the second operation environment after transmitting the face recognition model subjected to the first initialization to the second operation environment,
wherein a storage space in the first operation environment is greater than a storage space in the second operation environment, and wherein a security level of the first operation environment is lower than a security level in the second operation environment, and wherein the first security level is lower than the second security level.

20. A non-transitory computer readable storage medium having a computer program stored thereon, wherein, the computer program is configured to implement a method for processing data when executed by a processor, and the method comprises:
- obtaining a face recognition model stored in a first operation environment; and
- performing an initialization on the face recognition model in the first operation environment, and transmitting the face recognition model subjected to the initialization to a second operation environment for storing, comprising:
  - performing a first initialization on a first module having a first security level in the face recognition model in the first operation environment; and
  - performing a second initialization on a second model having a second security level in the face recognition model subjected to the first initialization in the second operation environment after transmitting the face recognition model subjected to the first initialization to the second operation environment,
- wherein a storage space in the first operation environment is greater than a storage space in the second operation environment, and wherein a security level of the first operation environment is lower than a security level in the second operation environment, and wherein the first security level is lower than the second security level.

* * * * *